(12) United States Patent
Cho et al.

(10) Patent No.: US 11,119,267 B2
(45) Date of Patent: Sep. 14, 2021

(54) REFLECTIVE SHEET AND DISPLAY APPARATUS HAVING THE SAME

(71) Applicant: SAMSUNG ELECTRONICS CO., LTD., Suwon-si (KR)

(72) Inventors: Byoungjin Cho, Suwon-si (KR); Yoonki Park, Suwon-si (KR); Jongbin Kim, Suwon-si (KR); Wonyeop Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/397,508

(22) Filed: Apr. 29, 2019

(65) Prior Publication Data

US 2020/0018892 A1 Jan. 16, 2020

(30) Foreign Application Priority Data

Jul. 13, 2018 (KR) ........................ 10-2018-0081856

(51) Int. Cl.
*F21V 8/00* (2006.01)

(52) U.S. Cl.
CPC ......... *G02B 6/0055* (2013.01); *G02B 6/0088* (2013.01)

(58) Field of Classification Search
CPC ............................ G02B 6/0055; G02B 6/0088
See application file for complete search history.

(56) References Cited

U.S. PATENT DOCUMENTS

| 8,789,959 B2 * | 7/2014 | Shimizu ................... H04N 5/64 |
| | | 362/612 |
| 8,944,622 B2 | 2/2015 | Jang |
| 9,335,584 B2 * | 5/2016 | Jang ................. G02F 1/133603 |
| 9,817,160 B2 | 11/2017 | Sakaguchi et al. |
| 10,162,219 B2 * | 12/2018 | Yeo ................... G02F 1/133605 |
| 2002/0039292 A1 | 4/2002 | Matsui |
| 2007/0184716 A1 | 8/2007 | Jung et al. |
| 2010/0165472 A1 * | 7/2010 | Hamasaki ................ G02B 5/10 |
| | | 359/627 |
| 2013/0128146 A1 | 5/2013 | Li et al. |
| 2013/0128528 A1 | 5/2013 | Hsiao et al. |
| 2013/0222705 A1 * | 8/2013 | Shimizu ............ G02F 1/133605 |
| | | 348/790 |
| 2013/0321738 A1 | 12/2013 | Yu |
| 2013/0343060 A1 | 12/2013 | Yu |
| 2017/0219884 A1 | 8/2017 | Yeo |

FOREIGN PATENT DOCUMENTS

| EP | 3346321 A1 | 7/2018 |
| JP | 2010-251122 A | 11/2010 |
| JP | 2014-022060 A | 2/2014 |

(Continued)

OTHER PUBLICATIONS

Written Opinion (PCT/ISA/237) issued by the International Searching Authority in corresponding International Application No. PCT/KR2019/006501, dated Sep. 18, 2019.

(Continued)

*Primary Examiner* — Kevin Quarterman
(74) *Attorney, Agent, or Firm* — Sughrue Mion, PLLC

(57) ABSTRACT

A reflective sheet of a display apparatus includes a sheet configured to reflect light; and a beading pattern protruding from a surface of the sheet.

22 Claims, 29 Drawing Sheets

(56) References Cited

FOREIGN PATENT DOCUMENTS

| | | |
|---|---|---|
| JP | 6051589 B2 | 12/2016 |
| KR | 10-1796332 B1 | 11/2017 |
| KR | 10-2018-0026233 A | 3/2018 |
| KR | 10-1832313 B1 | 4/2018 |

OTHER PUBLICATIONS

International Search Report (PCT/ISA/210), issued by International Searching Authority in corresponding International Application No. PCT/KR2019/006501, dated Sep. 18, 2019.
Communication dated Dec. 12, 2019, issued by the European Patent Office in counterpart European Application No. 19177448.8.

* cited by examiner

REFLECTIVE SHEET AND DISPLAY APPARATUS HAVING THE SAME

CROSS-REFERENCE TO RELATED APPLICATIONS

This application is based on and claims priority under 35 U.S.C. § 119 to Korean Patent Application No. 10-2018-0081856, filed on Jul. 13, 2018, in the Korean Intellectual Property Office, the disclosure of which is incorporated by reference herein in its entirety.

BACKGROUND

1. Field

The disclosure relates to a reflective sheet used in a display apparatus.

2. Description of the Related Art

A display apparatus is an apparatus that receives an image signal and displays an image, and may include a television, a monitor, and the like.

Such a display apparatus may include a display panel for displaying an image, a backlight for supplying light to the display panel, and a printed circuit board for operating the display panel.

The display apparatus may also include a bottom chassis for supporting the backlight and the printed circuit board.

The backlight may include a reflective sheet for reflecting light emitted from a light source toward the display panel. The reflective sheet may be provided on the top surface of the bottom chassis.

In recent years, the sizes of display panels, backlights, and printed circuit boards have increased and their thickness have become thinner due to the trend toward larger and slimmer display apparatuses.

Therefore, the reflective sheet of the backlight and the bottom chassis have also become larger in size and thinner in thickness.

However, due to the decreased thickness and increased size of the reflective sheet deformation of the reflective sheet has become a problem. For example, in the case of a direct illumination type display apparatus, the reflective sheet of the backlight may shift position with respect to a light source to cover the light source so that the backlight cannot uniformly supply light toward the display panel.

In addition, in the case of an edge illumination type display apparatus, reinforcing beads are formed at portions of the bottom chassis to increase the strength of the bottom chassis. In this case, portions of the reflective sheet corresponding to the portions of the bottom chassis where the reinforcing beads are formed sag into the reinforcing beads, so that the reflective sheet does not sufficiently reflect light toward the display panel.

When the reflective sheet of the backlight does not sufficiently reflect the light, a phenomenon in which the image displayed on the display panel is stained, that is, image stain phenomenon may occur.

SUMMARY

According to an aspect of the disclosure, a reflective sheet of a display apparatus according to an embodiment of the disclosure may include a sheet formed to reflect light; and a beading pattern formed to protrude from one surface of the sheet.

The beading pattern may include a plurality of rectilinear beadings parallel to one side of the sheet.

The beading pattern may include a plurality of dotted beadings parallel to one side of the sheet.

The beading pattern may include a grid pattern beading.

The beading pattern may include one of a plurality of polygonal beadings, a plurality of circular beadings, and a plurality of elliptic beadings.

The reflective sheet for a display apparatus may include a plurality of through holes formed at predetermined intervals on the sheet.

The plurality of through holes may include a plurality of through hole arrays parallel to the one side of the sheet, and the beading pattern may include a plurality of rectilinear beadings that are adjacent to the plurality of through hole arrays and correspond to one-to-one or two-to-one with the plurality of through hole arrays.

The beading pattern may include a grid pattern beading, and each of the plurality of through holes may be positioned within one grid of the grid pattern beading.

The beading pattern may include a plurality of rectangular beadings, and each of the plurality of rectangular beadings may be surrounded by four adjacent through holes forming a rectangle among the plurality of through holes.

The beading pattern may include a plurality of rectangular beadings, and each of the plurality of rectangular beadings may surround four adjacent through holes forming a rectangle among the plurality of through holes.

The beading pattern may include a plurality of circular beadings, and each of the plurality of circular beadings may be surrounded by four adjacent through holes forming a rectangle among the plurality of through holes.

The beading pattern may include a plurality of circular beadings, and each of the plurality of circular beadings may surround four adjacent through holes forming a rectangle among the plurality of through holes.

According to an aspect of the disclosure, a display apparatus may include a light guide plate; a bottom chassis disposed below the light guide plate; and a reflective sheet disposed on a top surface of the bottom chassis, wherein the reflective sheet may include a sheet formed to reflect light; and a beading pattern formed to protrude from one surface of the sheet.

The beading pattern of the reflective sheet may protrude toward the light guide plate.

The beading pattern of the reflective sheet may be concave toward the light guide plate.

The bottom chassis may include a plurality of reinforcing beads, and the beading pattern of the reflective sheet may be disposed at a position corresponding to the plurality of reinforcing beads of the bottom chassis.

The beading pattern may include at least one rectilinear beading across each of the plurality of reinforcing beads.

According to an aspect of the disclosure, a reflective sheet for a display apparatus includes a sheet configured to reflect light; and a beading pattern protruding from a surface of the sheet.

The beading pattern may include a plurality of rectilinear beadings parallel to an edge of the sheet.

Each of rectilinear beading from among the plurality of rectilinear beadings may have a length corresponding to a length of the edge of the sheet.

The beading pattern may include a plurality of dashed beadings parallel to the edge of the sheet.

The beading pattern may include a grid pattern beading.

The beading pattern may include one from among a plurality of polygonal beadings, a plurality of circular beadings, and a plurality of elliptic beadings.

The beading pattern may include a beading, and a cross-section of the beading may be one from among a triangle, a quadrangle, a semicircle, and a semi-ellipse.

The reflective sheet may further include a plurality of through holes formed at predetermined intervals on the sheet.

The plurality of through holes may include a plurality of through hole arrays parallel to the edge of the sheet, the beading pattern may include a plurality of rectilinear beadings, and each rectilinear beading from among the plurality of rectilinear beadings may extend adjacent to a through hole array from among the plurality of through hole arrays such that there is a one-to-one correspondence between the plurality of rectilinear beadings and the plurality of through hole arrays.

The plurality of through holes may include a plurality of through hole arrays parallel to the edge of the sheet, the beading pattern may include a plurality of rectilinear beadings, and for each through hole array from among the plurality of through hole arrays, a first rectilinear beading from among the plurality of rectilinear beadings may extend adjacent to and on a first side of the through hole array and a second rectilinear beading from among the plurality of rectilinear beadings may extend adjacent to and on a second side of the through hole array such that there is a two-to-one correspondence between the plurality of rectilinear beadings and the plurality of through hole arrays.

The beading pattern may include a grid pattern beading, and each through hole from among the plurality of through holes may be positioned within a respective unit square of the grid pattern beading.

The beading pattern may include a plurality of rectangular beadings, and first, second, third, and fourth through holes from among the plurality of through holes may be positioned at respective corners of each rectangular beading from among the plurality of rectangular beadings.

The beading pattern may include a plurality of rectangular beadings, and each rectangular beading from among the plurality of rectangular beadings may surround a respective group of four adjacent through holes to form a rectangle around the respective group of four adjacent through holes.

The beading pattern may include a plurality of circular beadings, and respective first, second, third, and fourth through holes from among the plurality of through holes may form a rectangle around each circular beading from among the plurality of circular beadings.

The beading pattern may include a plurality of circular beadings, and each circular beading from among the plurality of circular beadings may surround a respective group of four adjacent through holes to form a circle around the respective group of four adjacent through holes.

According to an aspect of the disclosure, a display apparatus includes a light guide plate; a bottom chassis disposed below the light guide plate; and a reflective sheet disposed on a top surface of the bottom chassis, wherein the reflective sheet includes a sheet configured to reflect light; and a beading pattern protruding from a surface of the sheet.

The beading pattern of the reflective sheet may protrude toward the light guide plate.

The beading pattern of the reflective sheet may protrude toward the bottom chassis.

The bottom chassis may include a plurality of reinforcing beads, and the beading pattern of the reflective sheet may be disposed at a position on the reflective sheet that overlaps the plurality of reinforcing beads of the bottom chassis in a top-bottom direction of the display apparatus.

For each reinforcing bead from among the plurality of reinforcing beads, the beading pattern may include at least one respective rectilinear beading that extends across the reinforcing bead.

According to an aspect of the disclosure, a display apparatus includes a light guide plate; and a reflective sheet provided behind the light guide plate along a viewing direction of the display apparatus, the reflective sheet including an array of protrusions configured to protrude from a surface of the reflective sheet toward or away from the light guide plate, the array of protrusions forming a corrugated shape in a cross-section of the reflective sheet, wherein the reflective sheet is configured to reflect light such that light exiting a front of the display apparatus along the viewing direction is not transmitted through the reflective sheet.

The array of protrusions may include a plurality of parallel linear protrusions.

The plurality of linear protrusions may extend in a first direction and may be arranged in a second direction perpendicular to the first direction.

The plurality of linear protrusions may form a shape of parallel dashed lines on the surface of the reflective sheet.

The reflective sheet may include a first region and a second region, the first region may include a first linear protrusion from among the array of protrusions, the first linear protrusion having a length similar to a length of an edge of the reflective sheet, and the second region may include a plurality of second linear protrusions from among the array of protrusions, the second linear protrusions forming a shape of collinear dashed lines parallel to the first linear protrusion.

The array of protrusions may form a grid pattern on the surface of the reflective sheet.

The array of protrusions may include a plurality of rectilinear protrusions, each rectilinear protrusion from among the plurality of rectilinear protrusions forming a shape of an outline of a rectangle.

A position of a first row of rectilinear protrusions from among the plurality of rectilinear protrusions may be shifted in a first direction from a position of an adjacent second row of rectilinear protrusions from among the plurality of rectilinear protrusions.

The array of protrusions may include a plurality of rectilinear protrusions, each rectilinear protrusion from among the plurality of rectilinear protrusions forming a shape of an outline of a circle.

A position of a first row of rectilinear protrusions from among the plurality of rectilinear protrusions may be shifted in a first direction from a position of an adjacent second row of rectilinear protrusions from among the plurality of rectilinear protrusions.

The array of protrusions may include a plurality of rectilinear protrusions, each rectilinear protrusion from among the plurality of rectilinear protrusions forming a shape of an outline of an ellipse.

The display apparatus may further include a bottom chassis including a bottom protrusion extending in a first direction, and the array of protrusions may include a first linear protrusion extending across the bottom protrusion of the bottom chassis in a second direction different from the first direction.

The display apparatus may further include a plurality of light sources protruding from the bottom chassis toward the reflective sheet, wherein the reflective sheet further includes an array of through holes through which the plurality of light sources protrude.

The array of through holes may include a plurality of parallel lines of through holes, and the array of protrusions may include a plurality of parallel linear protrusions such that a linear protrusion from among the plurality of parallel linear protrusions is positioned adjacent to and parallel to each respective line of through holes from the plurality of parallel lines of through holes.

The array of through holes may include a plurality of parallel lines of through holes, and the array of protrusions may include a plurality of parallel linear protrusions such that first and second linear protrusions from among the plurality of parallel linear protrusions are positioned on either side of and parallel to each respective line of through holes from the plurality of parallel lines of through holes.

The array of through holes may include a plurality of parallel lines of through holes, a first group of linear protrusions from among the array of protrusions may be formed in a shape of a dashed line on a first side of each respective line of through holes from among the plurality of parallel lines of through holes, and a second group of linear protrusions from among the array of protrusions may be formed in a shape of a dashed line on a second side of each respective line of through holes from among the plurality of parallel lines of through holes.

The array of through holes may include a plurality of through holes arranged in a grid, a first linear protrusion from among the array of protrusions may extend from each through hole from among the plurality of through holes in a first direction to a second through hole from among the plurality of through holes, and a second linear protrusion from among the array of protrusions may extend from each through hole from among the plurality of through holes in a second direction to a third through hole from among the plurality of through holes, the second direction being perpendicular to the first direction.

The array of protrusions may form a grid pattern on the surface of the reflective sheet, and each through hole from among the array of through holes may be positioned in a respective unit square of the grid pattern formed by the array of protrusions.

The array of protrusions may include a plurality of rectilinear protrusions, each rectilinear protrusion from among the plurality of rectilinear protrusions forming a shape of an outline of a rectangle, and first, second, third, and fourth through holes from among the plurality of through holes may be positioned at respective corners of each respective rectilinear protrusion from among the plurality of rectilinear protrusions.

The array of protrusions may include a plurality of rectilinear protrusions, each rectilinear protrusion from among the plurality of rectilinear protrusions forming a shape of an outline of a rectangle, and each rectilinear protrusion from among the plurality of rectilinear protrusion may surround a respective group of four adjacent through holes from among the plurality of through holes to form a rectangle around the respective group of four adjacent through holes.

The array of protrusions may include a plurality of rectilinear protrusions, each rectilinear protrusion from among the plurality of rectilinear protrusions forming a shape of an outline of a circle, and first, second, third, and fourth through holes from among the plurality of through holes may form a rectangle around each respective rectilinear protrusion from among the plurality of rectilinear protrusions.

The array of protrusions may include a plurality of rectilinear protrusions, each rectilinear protrusion from among the plurality of rectilinear protrusions forming a shape of an outline of a circle, and each rectilinear protrusion from among the plurality of rectilinear protrusion may surround a respective group of four adjacent through holes from among the plurality of through holes to form a circle around the respective group of four adjacent through holes.

With a reflective sheet for a display apparatus according to an embodiment of the disclosure having the above-described structure, the rigidity of the reflective sheet may be enhanced. Therefore, the image stain phenomenon of the display apparatus caused by deflection or lifting of the reflective sheet may be improved.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, certain embodiments of a reflective sheet and a display apparatus having the same according to the disclosure will be described in detail with reference to the accompanying drawings.

The matters defined herein, such as a detailed construction and elements thereof, are provided to assist in a comprehensive understanding of this description. Thus, it is apparent that example embodiments may be carried out without those defined matters. Also, well-known functions or constructions are omitted to provide a clear and concise description of example embodiments. Further, dimensions of various elements in the accompanying drawings may be arbitrarily increased or decreased for assisting in the comprehensive understanding of this description.

The terms 'first', 'second', etc. may be used to describe diverse components, but the components are not limited by the terms. The terms may be used merely to distinguish one component from the others. For example, without departing from the scope of the present disclosure, a first component may be referred to as a second component, and similarly, a second component may also be referred to as a first component.

The terms used in embodiments of the present disclosure may be construed as commonly known to those skilled in the art unless otherwise defined.

Further, the terms 'leading end', 'rear end', 'upper side', 'lower side', 'top end', 'bottom end', etc. used in the present disclosure are defined with reference to the drawings. However, the shape and position of each component are not limited by the terms.

Hereinafter, a display apparatus according to an embodiment of the disclosure will be described with reference to FIG. 1.

Figure 1:
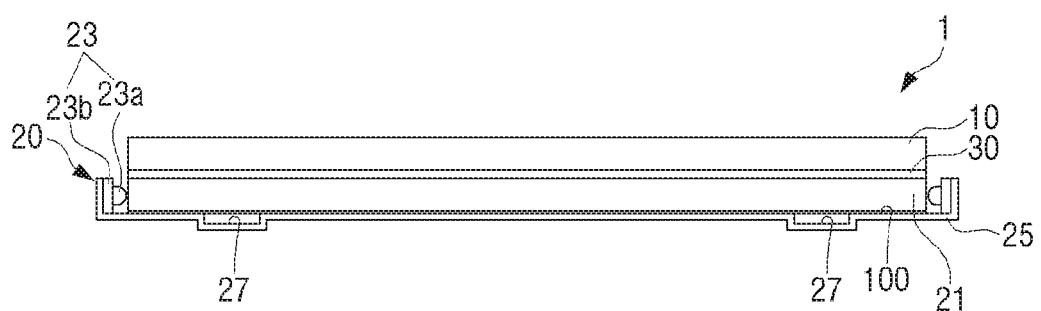
FIG. 1 is a cross-sectional view illustrating a display apparatus according to an embodiment.

FIG. 1 is a cross-sectional view illustrating a display apparatus according to an embodiment of the disclosure.

Referring to FIG. 1, a display apparatus 1 according to an embodiment of the disclosure may include a display panel 10 on which an image is displayed, a backlight 20 configured to supply light to the display panel 10, and an optical sheet 30 disposed between the display panel 10 and the backlight 20 and configured to improve the characteristics of light supplied from the backlight 20.

The display panel 10 is formed of a liquid crystal panel and configured to receive light from the backlight 20 disposed at the rear thereof and to display an image.

The backlight 20 may include a light guide plate 21 formed in a rectangular flat plate shape so as to correspond to the shape of the display panel 10, a pair of light sources 23 that are disposed on opposite sides of the light guide plate 21 and that irradiate light to opposite side surfaces of the light guide plate 21, a bottom chassis 25 that houses the light guide plate 21 and the pair of light sources 23, and a reflective sheet 100 disposed between the light guide plate 21 and the bottom chassis 25.

The light guide plate 21 may be formed of a transparent resin material capable of guiding light.

The reflective sheet 100 is formed of a white resin material or plastic so as to reflect light, and is disposed on the rear surface (i.e., the bottom surface with respect to FIG. 1) of the light guide plate 21. Accordingly, the light emitted from the light sources 23 is incident on the light guide plate 21 through both side surfaces of the light guide plate 21. The light emitted from the rear surface of the light guide plate 21 is reflected by the reflective sheet 100 and is discharged to the display panel 10 through the front surface of the light guide plate 21 such that light exiting the display panel 10 in a viewing direction (i.e., in an upward direction with respect to FIG. 1) is not transmitted through the reflective sheet 100.

The reflective sheet 100 according to an embodiment of the disclosure includes a beading pattern 103 for enhancing rigidity. The reflective sheet 100 according to an embodiment of the disclosure including the beading pattern 103 will be described in detail below.

Each of the pair of light sources 23 includes a plurality of light emitting diodes 23a and a substrate 23b on which the plurality of light emitting diodes 23a are arranged in a line. Each of the substrates 23b is formed in a rectangular plate shape having a long length corresponding to a length of a respective side surface of the light guide plate 21, and the plurality of light emitting diodes 23a are disposed on the substrates 23b to face the respective side surfaces of the light guide plate 21.

The bottom chassis 25 may be formed of a metal material so that heat generated from the light sources 23 or a printed circuit board (not illustrated) may easily be radiated to the outside. The bottom chassis 25 may include a plurality of reinforcing beads 27 to increase the rigidity of the bottom chassis 25 while reducing the thickness of the bottom chassis 25.

The optical sheet 30 improves optical characteristics of light incident on the display panel 10, and may include a high luminance prism sheet, a diffuser sheet, and the like.

In addition, although not illustrated, the display apparatus 1 may include a middle mold for supporting the display panel 10, a front chassis disposed in front of the middle mold, a case that forms an outer appearance of the display apparatus 1 and accommodates the front chassis and the rear chassis 25 (i.e., the bottom chassis), and a printed circuit board that is disposed inside the case and configured to control the display panel 10 to display an image.

Hereinafter, the reflective sheet 100 that may be used in the display apparatus 1 as illustrated in FIG. 1 will be described in detail with reference to the accompanying drawings.

Figure 2:
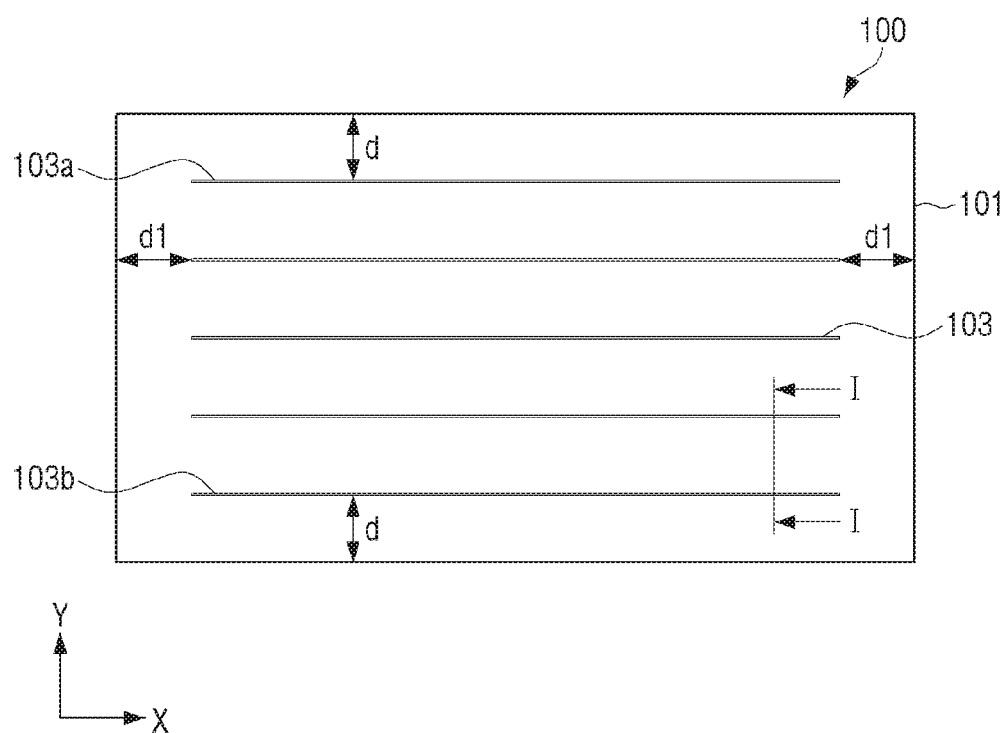
FIG. 2 is a plan view illustrating a reflective sheet for a display apparatus according to an embodiment.
Figure 3:
FIG. 3 is a partially enlarged cross-sectional view illustrating the reflective sheet for a display apparatus taken along the line I-I in FIG. 2.
Figure 4A:
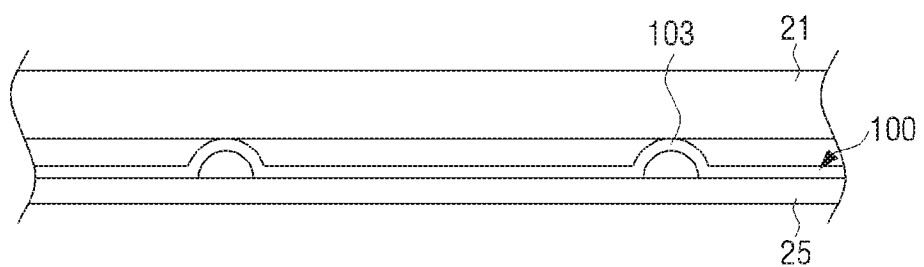
FIGS. 4A and 4B are partially enlarged cross-sectional views illustrating relationship between a reflective sheet and a light guide plate in a display apparatus according to an embodiment.
Figure 4B:
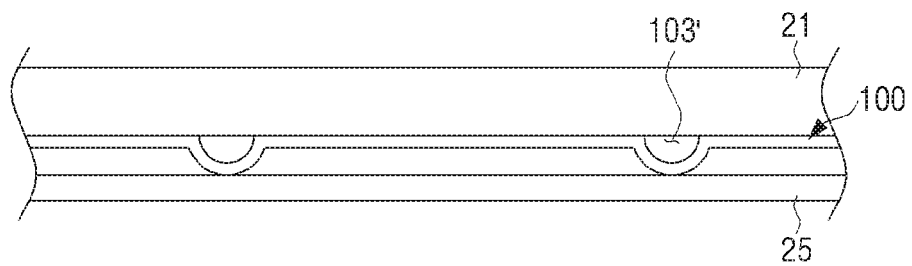

FIG. 2 is a plan view illustrating a reflective sheet 100 for a display apparatus according to an embodiment of the disclosure, and FIG. 3 is a partially enlarged cross-sectional view illustrating the reflective sheet for a display apparatus taken along the line I-I in FIG. 2. FIGS. 4A and 4B are partially enlarged cross-sectional views illustrating the relationship between a reflective sheet and a light guide plate in a display apparatus according to an embodiment of the disclosure.

Referring to FIGS. 2 and 3, the reflective sheet 100 according to an embodiment of the disclosure may include a sheet 101 formed to reflect light and a beading pattern 103 formed to protrude from one surface of the sheet 101.

The sheet 101 is in the form of a rectangular thin film corresponding to the shape of the light guide plate 21, and is formed in white so as to reflect light. The sheet 101 may be formed of a plastic of the polyester type such as polyester terephthalate (PET), polycarbonate (PC), and the like.

The beading pattern 103 protrudes from one surface of the sheet 101 and improves the rigidity of the sheet 101. In other words, the beading pattern 103 may be formed as a plurality of protrusions on one surface of the sheet 101. The beading pattern may include an array of protrusions forming a corrugated shape in a cross-section of the reflective sheet 100. The corrugated shape may include protrusions that are spaced apart from each other with a flat portion of the sheet 101 extending between the protrusions. The corrugated shape may be formed such that a first surface of the sheet 101 includes a convex portion and a second surface of the sheet 101 includes a corresponding concave portion at the same position as that of the convex portion as shown, e.g., in FIG. 3.

For example, as illustrated in FIG. 4A, the beading pattern 103 may be formed to protrude toward the light guide plate 21. Therefore, a concave groove forming the beading pattern 103 is formed in the opposite surface of the sheet 101. The protruding height of the beading pattern 103 may be made as high as possible without damaging the sheet 101 when the beading pattern 103 is formed on the sheet 101.

As another example, as illustrated in FIG. 4B, the beading pattern 103' may be formed as a concave groove toward the light guide plate 21. In other words, the beading pattern 103' may protrude toward the bottom chassis 25 instead of the light guide plate 21. Therefore, a protrusion protruding downward to form the beading pattern 103' is formed on the opposite surface of the sheet 101 and a concave groove forming the beading pattern 103 is formed on the surface of the sheet 101 that faces the light guide plate 21.

The beading pattern 103 may be formed using a mold. For example, the sheet 101 is positioned between an upper mold provided with a convex portion corresponding to a punch and a lower mold provided with a concave portion corresponding to the convex portion and then the upper mold is pressed, so that the beading pattern 103, which protrudes from one surface of the sheet 101 and is recessed on the opposite surface of the sheet 101, may be formed on the sheet 101.

Hereinafter, the reflective sheet 100 formed so that the beading pattern 103 protrudes toward the light guide plate 21 as illustrated in FIG. 4A will be described. However, the following description may be equally applicable to the reflective sheet 100 in which the beading pattern 103' is recessed toward the light guide plate 21 (i.e., protrudes toward the bottom chassis 25) as illustrated in FIG. 4B.

The beading pattern 103 may be formed in various patterns such as a plurality of rectilinear lines, a plurality of rectangles, a plurality of circles, and the like.

The beading pattern 103 as illustrated in FIG. 2 is formed of a plurality of rectilinear beadings parallel to one edge of the sheet 101. The plurality of rectilinear beadings 103 are formed on the sheet 101 at predetermined intervals. The plurality of rectilinear beadings 103 may be provided parallel to the longest edge 111a (see FIG. 6, for example) of the sheet 101. At this time, each of the plurality of rectilinear beadings 103 may be formed to have a length corresponding to the length of one edge of the sheet 101. Therefore, each rectilinear beading 103 may extend in the longitudinal direction of the sheet 101 such that only one rectilinear beading 103 is formed at each position in the width direction of the sheet 101. The plurality of rectilinear beadings 103 may thus be arranged in the width direction of the sheet 101. Here, the longitudinal direction of the sheet 101 refers to a direction in which the length of the rectangular sheet 101 is long (X direction in FIG. 2), and the width direction of the sheet 101 refers to a direction in which the length of the sheet 101 is short (Y direction in FIG. 2).

Two outermost rectilinear beadings 103a and 103b among the plurality of rectilinear beadings 103 are formed to be spaced apart from the upper edge and the lower edge (with respect to FIG. 2) of the sheet 101 by a predetermined distance d, respectively. At this time, the distance d between the rectilinear beading 103 and the upper edge or the lower edge of the sheet 101 may be set to be equal to or larger than a minimum distance at which the upper edge or lower edge of the sheet 101 is not deformed as the rectilinear beadings 103 are formed. Also, opposite ends of each of the plurality of rectilinear beadings 103 are formed to be spaced apart from opposite side edges of the sheet 101 by a predetermined distance d1. At this time, the distance d1 between the one end of the rectilinear beadings 103 and the one side edge of the sheet 101 may be set to be not less than a minimum distance at which the side edge of the sheet 101 is not deformed as the rectilinear beadings 103 are formed.

Referring to FIG. 3, the cross-section of each of the plurality of rectilinear beadings 103 forming the beading pattern 103 is formed in a substantially semicircular shape. However, the shape of the cross-section of each of the rectilinear beadings 103 is not limited thereto. The rectilinear beadings 103 may be formed in various shapes such as a triangle, a quadrangle, a polygon having pentagonal shape or the like so long as the rigidity of the sheet 101 can be enhanced.

FIGS. 5A, 5B, 5C, 5D, and 5E are cross-sectional views illustrating cross-sections of various beadings that can be used as a beading pattern of a reflective sheet for a display apparatus according to an embodiment of the disclosure.

Figure 5A:
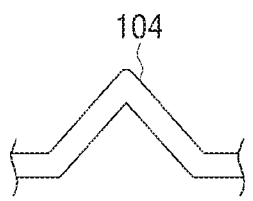
FIGS. 5A, 5B, 5C, 5D, and 5E are cross-sectional views illustrating cross-sections of various beadings that can be used as a beading pattern of a reflective sheet for a display apparatus according to an embodiment.
Figure 5B:
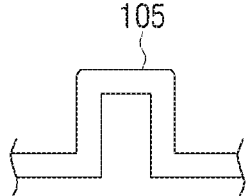
Figure 5C:
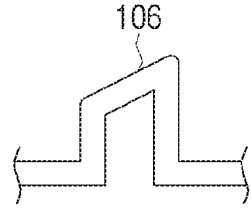
Figure 5D:
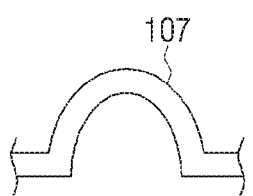
Figure 5E:
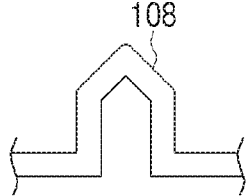

FIG. 5A illustrates a case where the cross-section of the beading 104 forming the beading pattern is triangular. FIG. 5B illustrates a case where the cross-section of the beading 105 forming the beading pattern is rectangular. FIG. 5C illustrates a case where the cross-section of the beading 106 forming the beading pattern is trapezoidal. FIG. 5D illustrates a case where the cross-section of the beading 107 forming the beading pattern is semi-elliptical. FIG. 5E illustrates a case where the cross-section of the beading 108 forming the beading pattern is pentagonal.

Figure 6:
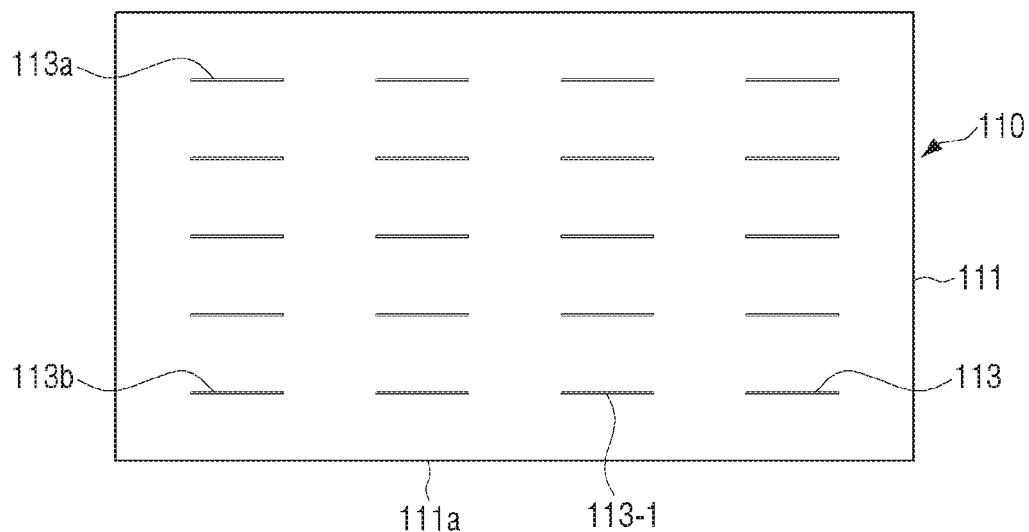
FIG. 6 is a view illustrating a reflective sheet for a display apparatus according to an embodiment having a plurality of dotted beadings as a beading pattern.

FIG. 6 is a view illustrating a reflective sheet for a display apparatus according to an embodiment of the disclosure having a plurality of dotted beadings (i.e., dashed beadings) as a beading pattern.

Referring to FIG. 6, a beading pattern 113 of a reflective sheet 110 is formed of a plurality of dotted beadings. Here, the dotted beading 113 refers to a plurality of rectilinear beads 113-1 having a short length that are formed at predetermined intervals along the long edge 111a of the sheet 101. At this time, each of the plurality of dotted beadings 113 is formed of a plurality of short rectilinear beads 113-1 having a length shorter than the length of one edge of the sheet 111. Therefore, each of the plurality of short rectilinear beads 113-1 may extend in the longitudinal direction of the sheet 111 such that multiple rectilinear beads 113-1 are formed in the longitudinal direction and arranged in the width direction of the sheet 111. The plurality of rectilinear beads 113-1 may each extend parallel to the longitudinal direction.

In a manner similar to the example embodiment shown in FIG. 2, the two outermost dotted beadings 113a and 113b among the plurality of dotted beadings 113 are formed to be spaced apart from the upper edge and lower edge of the sheet 111 by a predetermined distance, respectively. Also, opposite ends of each of the plurality of dotted beadings 113 are formed to be spaced apart from opposite side edges of the sheet 111 by a predetermined distance.

The cross-section of each of the dotted beadings 113 may be formed to be the same as or similar to the cross-section of each of the plurality of rectilinear beadings 103 as described above.

In the above description, the beading patterns 103 and 113 are formed of the plurality of straight lines or the plurality of dotted (i.e., dashed) lines, but the shape of the beading pattern is not limited thereto. The beading pattern may be formed by mixing the plurality of rectilinear beadings and the plurality of dotted beadings.

Figure 7:
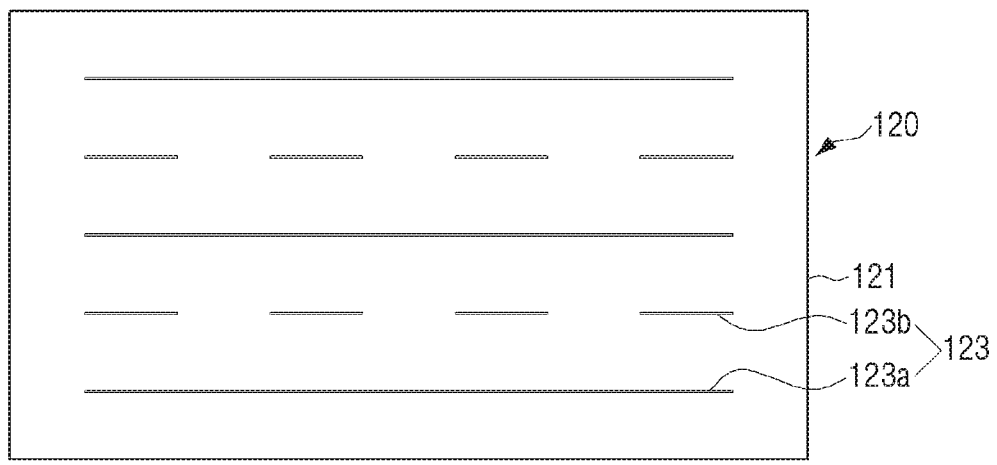
FIG. 7 is a view illustrating a reflective sheet for a display apparatus according to an embodiment having a plurality of rectilinear beadings and a plurality of dotted beadings as a beading pattern.

FIG. 7 is a view illustrating a reflective sheet for a display apparatus according to an embodiment of the disclosure having a plurality of rectilinear beadings and a plurality of dotted beadings as a beading pattern.

Referring to FIG. 7, a beading pattern 123 of a reflective sheet 120 is alternately formed of rectilinear beadings and dotted beadings. The plurality of rectilinear beadings 123a and the plurality of dotted beadings 123b are formed parallel to one edge of the sheet 121.

In FIG. 7, the two rectilinear beadings 123a are formed adjacent to the upper edge and the lower edge of the sheet 121. However, the rectilinear beadings 123a may not be adjacent to the upper edge and the lower edge of the sheet 121. Although not illustrated, at least one dotted beading 123b may be formed adjacent to the upper edge or the lower edge of the sheet 121, or two dotted beadings 123b may be formed adjacent to the upper edge and the lower edge of the sheet 121.

Although the case where the beading patterns 103, 113, and 123 are formed of a plurality of straight lines or a plurality of dotted lines has been described above, the shape of the beading patterns is not limited thereto. The beading pattern may be formed in various shapes such as a plurality of polygons, a plurality of circles, a plurality of ellipses, and the like. Hereinafter, a reflective sheet having a beading pattern composed of various shapes will be described.

Figure 8:
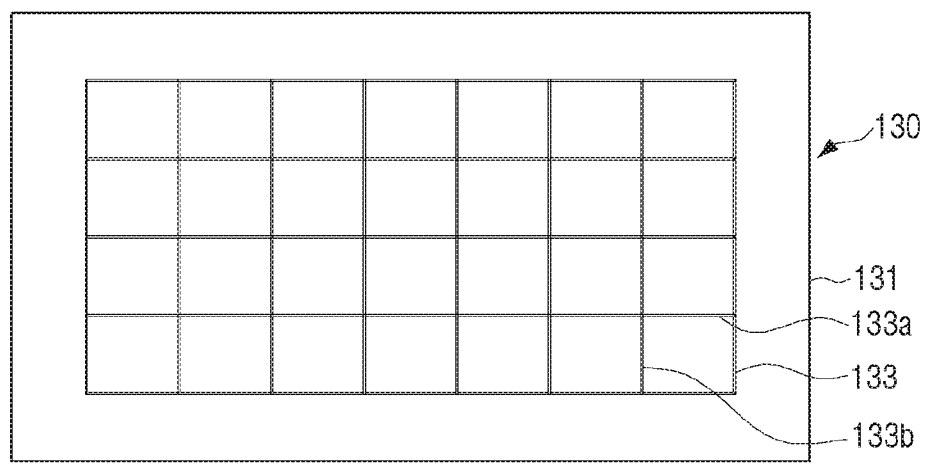
FIG. 8 is a view illustrating a reflective sheet for a display apparatus according to an embodiment having a grid pattern beading as a beading pattern.

FIG. 8 is a view illustrating a reflective sheet for a display apparatus according to an embodiment of the disclosure having a grid pattern beading as a beading pattern.

Referring to FIG. 8, a beading pattern 133 of a reflective sheet 130 is formed of a grid pattern beading 133. In other words, a plurality of horizontal rectilinear beadings 133a and a plurality of vertical rectilinear beadings 133b (with respect to FIG. 8) are formed so as to cross each other at right angles. At this time, the intervals between the plurality of horizontal rectilinear beadings 133a and the plurality of vertical rectilinear beadings 133b may be made substantially the same. Alternatively, the intervals between the plurality of horizontal rectilinear beadings 133a and the plurality of vertical rectilinear beadings 133b may be different from each other.

In a manner similar to the example embodiment shown in FIG. 2, the four rectilinear beadings forming the edges of the grid pattern beading 133 are formed to be spaced apart from the upper edge, the lower edge, and both side edges of the sheet 131 by a predetermined distance. At this time, the predetermined distance may be set to be equal to or larger than a minimum distance at which the edges of the sheet 131 are not deformed as the grid pattern beading 133 is formed.

The cross-section of each of the plurality of rectilinear beadings 133a and 133b forming the grid pattern beading 133 may be the same or similar to the cross-section of each of the plurality of rectilinear beadings 103 as described above.

Figure 9:
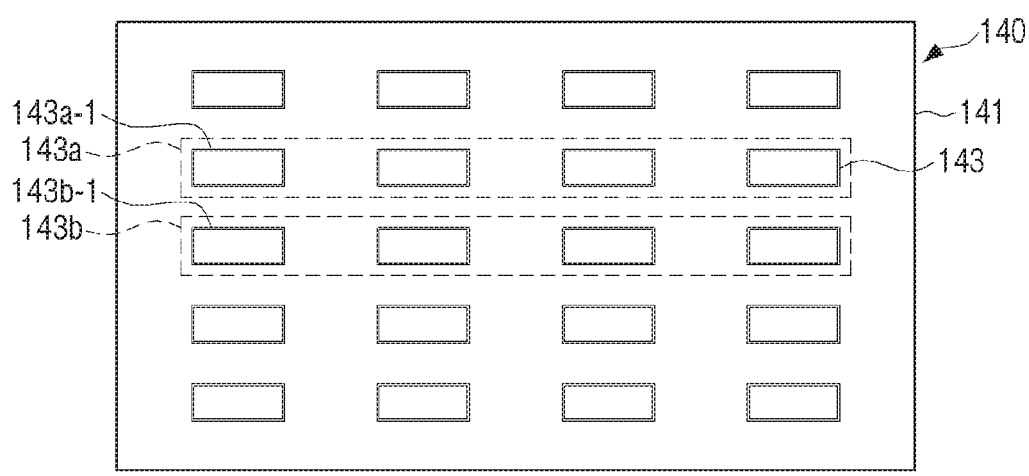
FIG. 9 is a view illustrating a reflective sheet for a display apparatus according to an embodiment having a plurality of rectangular beadings as a beading pattern.

FIG. 9 is a view illustrating a reflective sheet for a display apparatus according to an embodiment of the disclosure having a plurality of rectangular beadings as a beading pattern.

Referring to FIG. 9, a beading pattern 143 of a reflective sheet 140 is formed of a plurality of rectangular beadings. The plurality of rectangular beadings 143 are formed to be spaced apart from each other by a predetermined distance. The plurality of rectangular beadings 143 are formed to be the same size and extend parallel to the longitudinal direction. The plurality of rectangular beadings are arranged in both the longitudinal direction and the width direction of the sheet 141 as shown in FIG. 9. The plurality of rectangular beadings may include adjacent rectangular beading arrays 143a and 143b that are aligned in the width direction (i.e., the vertical direction with respect to FIG. 9). The rectangular beading array 143a may include a rectangular beading 143a-1, while the rectangular beading array 143b may include a rectangular beading 143b-1.

In a manner similar to the example embodiment shown in FIG. 2, the outermost rectangular beadings 143 among the plurality of rectangular beadings 143 are formed to be spaced apart from the edges of the sheet 141 by a predetermined distance. At this time, the predetermined distance may be set to be equal to or larger than a minimum distance at which the edges of the sheet 141 are not deformed as the plurality of rectangular beadings 143 are formed.

The cross-section of the rectilinear beading forming each side of the rectangular beading 143 may be formed to be the same or similar to the cross-section of each of the plurality of rectilinear beadings 103 as described above.

Figure 10:
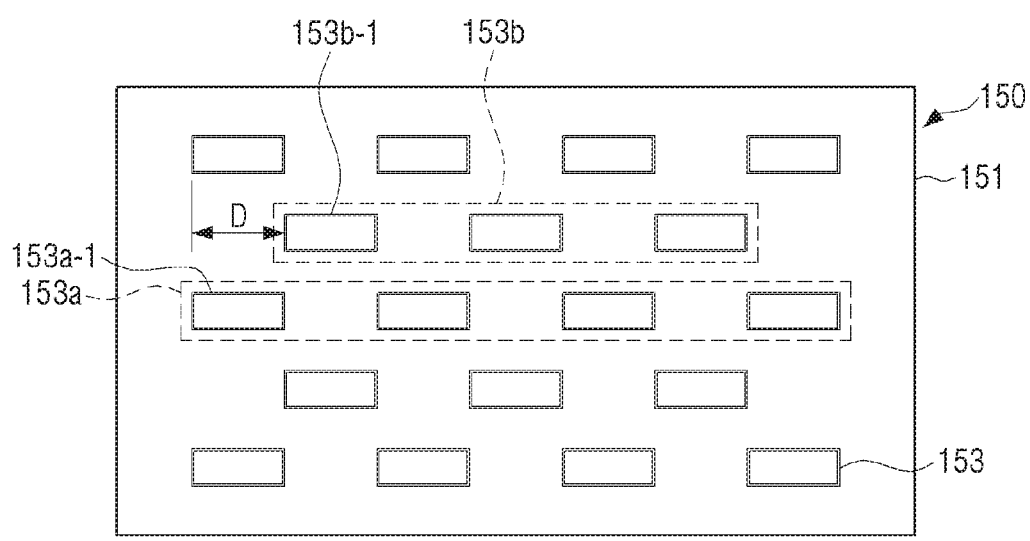
FIG. 10 is a view illustrating a reflective sheet for a display apparatus according to an embodiment having a plurality of rectangular beadings as a beading pattern.

FIG. 10 is a view illustrating a reflective sheet for a display apparatus according to an embodiment of the disclosure having a plurality of rectangular beadings as a beading pattern.

Referring to FIG. 10, a beading pattern 153 of a reflective sheet 150 is formed of a plurality of rectangular beadings. The plurality of rectangular beadings 153 are formed to be spaced apart from each other by a predetermined distance on a sheet 151. The beading pattern 153 of the reflective sheet 150 of FIG. 10 is formed so that two adjacent rectangular beading arrays 153a and 153b are shifted from each other in the longitudinal direction of the sheet 151. In other words, the two adjacent rectangular beading arrays 153a and 153b are not aligned in the width direction of the sheet 151 (i.e., the vertical direction with respect to FIG. 10). In contrast, as described above, the beading pattern 143 of the reflective sheet 140 of FIG. 9 is different from the beading pattern 153 of FIG. 10 in that the beading pattern 143 is formed so that two adjacent rectangular beading arrays 143a and 143b are formed to be positioned in a straight line in the width direction of the sheet 141.

The rectangular beading array 153a may include a rectangular beading 153a-1, while the rectangular beading array 153b may include a rectangular beading 153b-1. As shown in FIG. 10, the rectangular beading 153a-1 and the rectangular beading 153b-1 are not aligned in the width direction of the sheet 151.

In detail, in FIG. 10, one side of the rectangular beading 153b-1 of the second rectangular beading array 153b adjacent to the first rectangular beading array 153a is spaced apart by a predetermined distance D from the corresponding side of the rectangular beading 153a-1 of the first rectangular beading array 153a in the longitudinal direction of the sheet 151.

Figure 11:
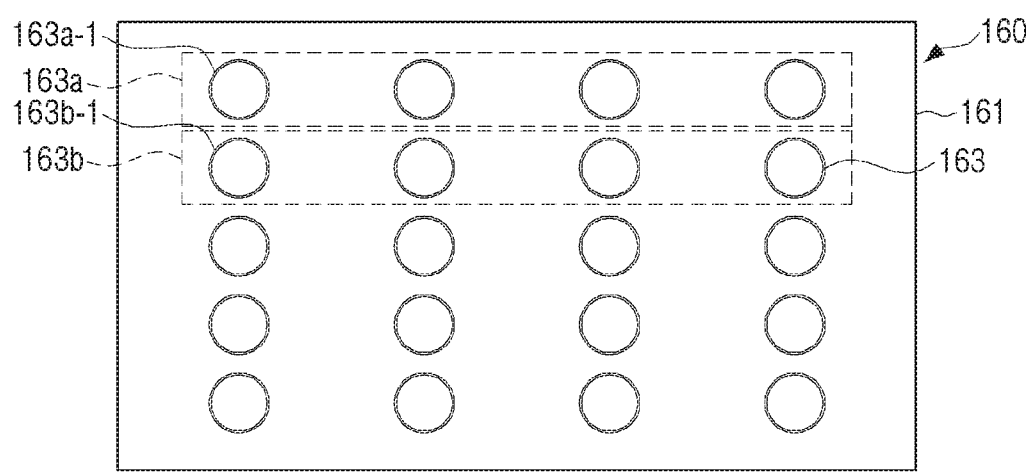
FIG. 11 is a view illustrating a reflective sheet for a display apparatus according to an embodiment having a plurality of circular beadings as a beading pattern.

FIG. 11 is a view illustrating a reflective sheet for a display apparatus according to an embodiment of the disclosure having a plurality of circular beadings as a beading pattern.

Referring to FIG. 11, a beading pattern 163 of a reflective sheet 160 is formed of a plurality of circular beadings. The plurality of circular beadings 163 are formed to be spaced apart from each other by a predetermined distance. The plurality of circular beadings 163 are formed in the same size and are arranged in both the longitudinal direction and the width direction of the sheet 161.

In a manner similar to the example embodiment shown in FIG. 2, the outermost circular beadings 163 among the plurality of circular beadings 163 are formed to be spaced apart from the edges of the sheet 161 by a predetermined distance. At this time, the predetermined distance may be set to be equal to or larger than a minimum distance at which the edges of the sheet 161 are not deformed as the plurality of circular beadings 163 are formed.

The cross-section of the beading forming the circular beading 163 may be formed to be the same or similar to the cross-section of each of the plurality of rectilinear beadings 103 as described above.

Figure 12:
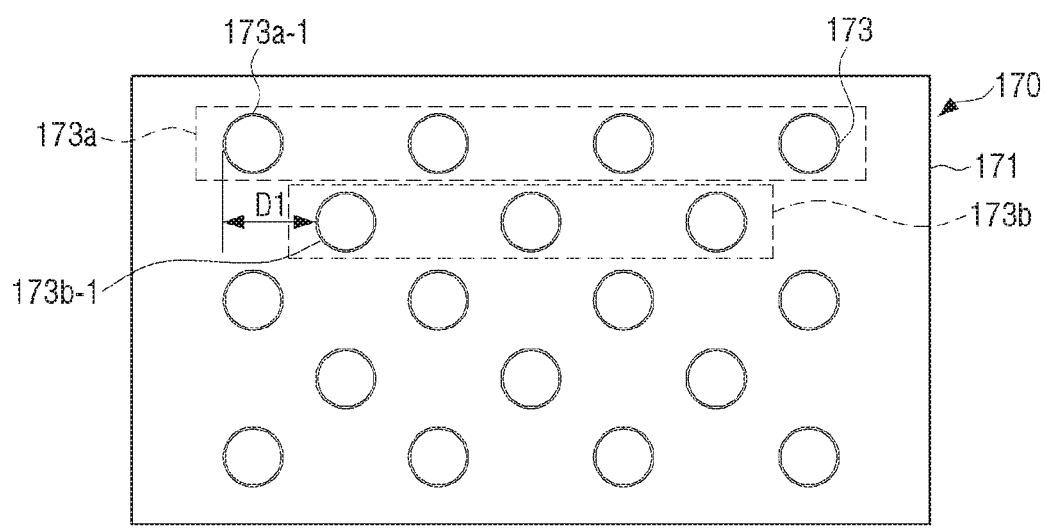
FIG. 12 is a view illustrating a reflective sheet for a display apparatus according to an embodiment having a plurality of circular beadings as a beading pattern.

FIG. 12 is a view illustrating a reflective sheet for a display apparatus according to an embodiment of the disclosure having a plurality of circular beadings as a beading pattern.

Referring to FIG. 12, a beading pattern 173 of a reflective sheet 170 is formed of a plurality of circular beadings. The plurality of circular beadings 173 are formed to be spaced apart from each other by a predetermined distance on a sheet 171. The beading pattern 173 of the reflective sheet 170 of FIG. 12 is formed so that two adjacent circular beading arrays 173a and 173b are shifted from each other in the longitudinal direction of the sheet 171. In other words, the two adjacent circular beading arrays 173a and 173b are not aligned in the width direction of the sheet 171 (i.e., the vertical direction with respect to FIG. 12). In contrast, as described above, the beading pattern 163 of the reflective sheet 160 of FIG. 11 is different from the beading pattern 173 of FIG. 12 in that the beading pattern 163 is formed so that two adjacent circular beading arrays 163a and 163b are formed to be positioned in a straight line in the width direction of the sheet 171.

The circular beading array 173a may include a circular beading 173a-1, while the circular beading array 173b may include a circular beading 173b-1. As shown in FIG. 12, the circular beading 173a-1 and the circular beading 173b-1 are not aligned in the width direction of the sheet 171.

In detail, in FIG. 12, one side end of the circular beading 173b-1 of the second circular beading array 173b adjacent to the first circular beading array 173a is spaced apart by a predetermined distance D1 from the corresponding side end of the circular beading 173a-1 of the first circular beading array 173a in the longitudinal direction of the sheet 171.

Figure 13:
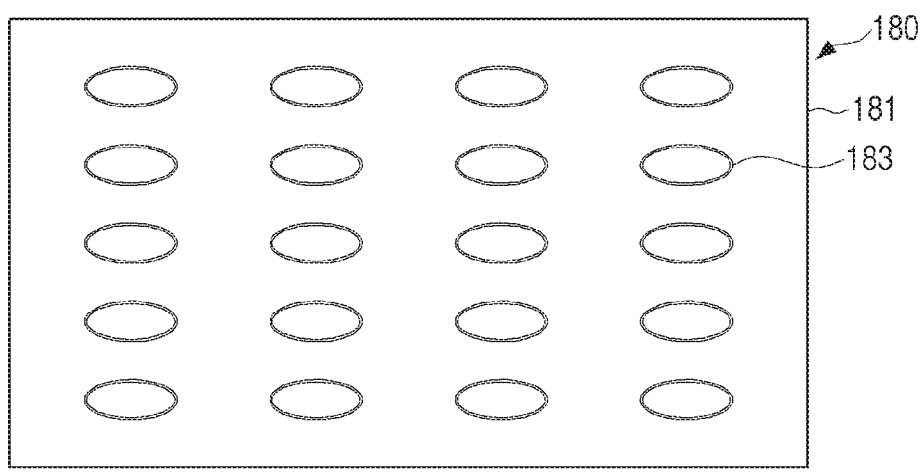
FIG. 13 is a view illustrating a reflective sheet for a display apparatus according to an embodiment having a plurality of elliptical beadings as a beading pattern.

FIG. 13 is a view illustrating a reflective sheet for a display apparatus according to an embodiment of the disclosure having a plurality of elliptical beadings as a beading pattern.

Referring to FIG. 13, a beading pattern 183 of a reflective sheet 180 is formed of a plurality of elliptical beadings. The plurality of elliptical beadings 183 are formed to be spaced apart from each other by a predetermined distance. The plurality of elliptical beadings 183 are formed in the same size and are formed parallel to the longitudinal direction. The plurality of elliptical beadings are arranged in both the longitudinal direction and the width direction of the sheet 181.

In a manner similar to the example embodiment shown in FIG. 2, the outermost elliptical beadings among the plurality of elliptical beadings 183 are formed to be spaced apart from the edges of the sheet 181 by a predetermined distance. At this time, the predetermined distance may be set to be equal to or larger than a minimum distance at which the edges of the sheet 181 are not deformed as the plurality of elliptical beadings 183 are formed.

The cross-section of the beading forming the elliptical beading 183 may be formed to be the same or similar to the cross-section of each of the plurality of rectilinear beadings 103 as described above.

Although not illustrated, similar to the beading pattern having the plurality of circular beadings 173 of the reflective sheet 170 as illustrated in FIG. 12, the beading pattern of the reflective sheet may be formed so that a plurality of elliptical beadings constituting two adjacent elliptical beading arrays are shifted from each other in the longitudinal direction.

As described above, when the beading pattern is formed on the reflective sheet, the reflective sheet may be prevented from sagging into the groove of the reinforcing beads of the bottom chassis when the reflective sheet is provided on the bottom chassis.

Hereinafter, the relationship between the beading pattern of the reflective sheet and the reinforcing beads of the bottom chassis will be described with reference to FIGS. 14A and 14B.

Figure 14A:
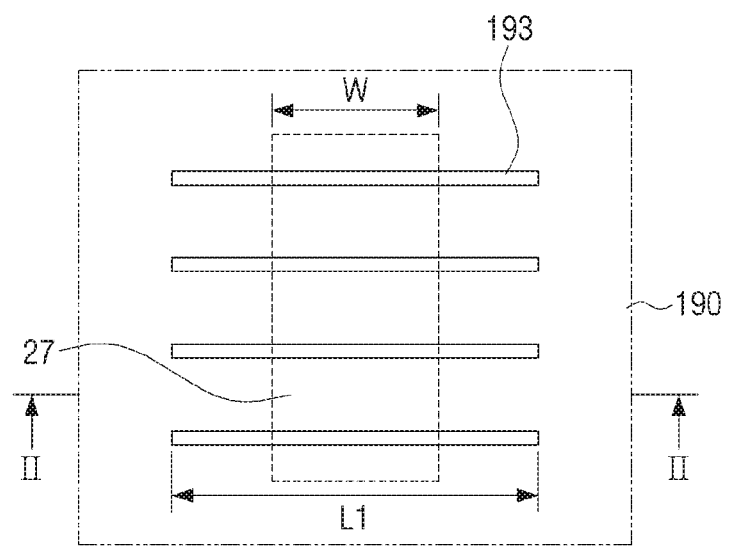
FIG. 14A is a partially enlarged plan view illustrating a beading pattern of a reflective sheet positioned on a reinforcing bead of a bottom chassis.
Figure 14B:
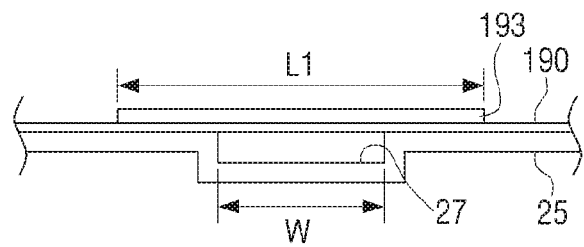
FIG. 14B is a cross-sectional view illustrating the reflective sheet taken along the line □-□ in FIG. 14A.

FIG. 14A is a partially enlarged plan view illustrating a beading pattern of a reflective sheet positioned on a reinforcing bead of a bottom chassis, and FIG. 14B is a cross-sectional view illustrating the reflective sheet taken along the line II-II in FIG. 14A.

Referring to FIGS. 14A and 14B, a beading pattern 193 of a reflective sheet 190 is formed of a plurality of rectilinear beadings. At this time, the plurality of rectilinear beadings 193 are formed to cross the reinforcing bead 27 of the bottom chassis 25. Therefore, the length L1 of each of the plurality of rectilinear beadings 193 is formed to be larger than the width W of the reinforcing bead 27 of the bottom chassis 25.

When the beading pattern 193 of the reflective sheet 190 is formed to cross the reinforcing bead 27 of the bottom chassis 25 as described above, the rigidity of the reflective sheet 190 increases such that the reflective sheet 190 may be prevented from sagging into the reinforcing bead 27 of the bottom chassis 25.

Although the reflective sheet that can be used in the edge-type display apparatus 1 as illustrated in FIG. 1 has been described above, the reflective sheet according to an embodiment of the disclosure may also be used in a direct-type display apparatus.

Hereinafter, a display apparatus having a reflective sheet according to an embodiment of the disclosure will be described with reference to FIG. 15.

Figure 15:
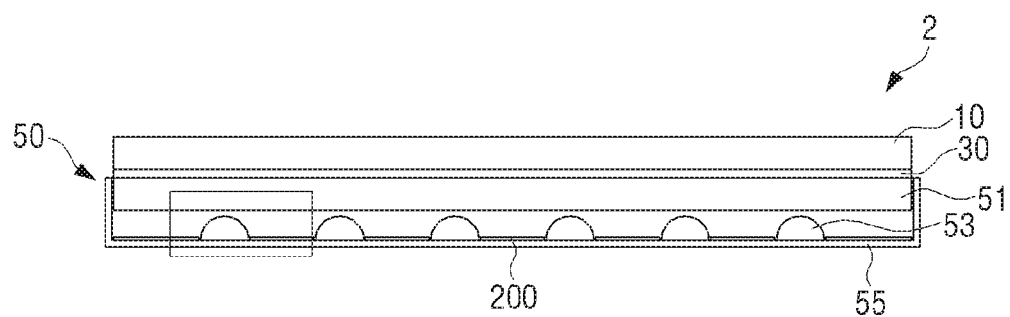
FIG. 15 is a cross-sectional view illustrating a display apparatus according to an embodiment of the disclosure.

FIG. 15 is a cross-sectional view illustrating a display apparatus according to an embodiment of the disclosure.

Referring to FIG. 15, a display apparatus 2 according to an embodiment of the disclosure may include a display panel 10 on which an image is displayed, a backlight 50 configured to supply light to the display panel 10, and an optical sheet 30 disposed between the display panel 10 and the backlight 50 and configured to improve the characteristics of light supplied from the backlight 50 to the display panel 10.

The display panel 10 is formed of a liquid crystal panel and receives light from the backlight 50 disposed at the rear thereof to display an image.

The backlight 50 may include a light guide plate 51 formed in a rectangular flat plate shape so as to correspond to the shape of the display panel 10, a plurality of light sources 53 that are disposed on a top surface of a bottom chassis 55 below the light guide plate 51 (i.e., in a downward direction with respect to FIG. 15) and irradiate light toward the light guide plate 51, the bottom chassis 55 that houses the light guide plate 51 and the plurality of light sources 53, and a reflective sheet 200 disposed on the bottom chassis 55.

The light guide plate 51 is formed of a transparent resin material capable of guiding light.

The reflective sheet 200 is formed of a white resin material or plastic so as to reflect light, and is disposed below the light guide plate 51. Accordingly, some light emitted from the light sources 53 and the light reflected by the optical sheet 30 are reflected by the reflective sheet 200 and then discharged toward the display panel 10 through the light guide plate 51.

Figure 16:
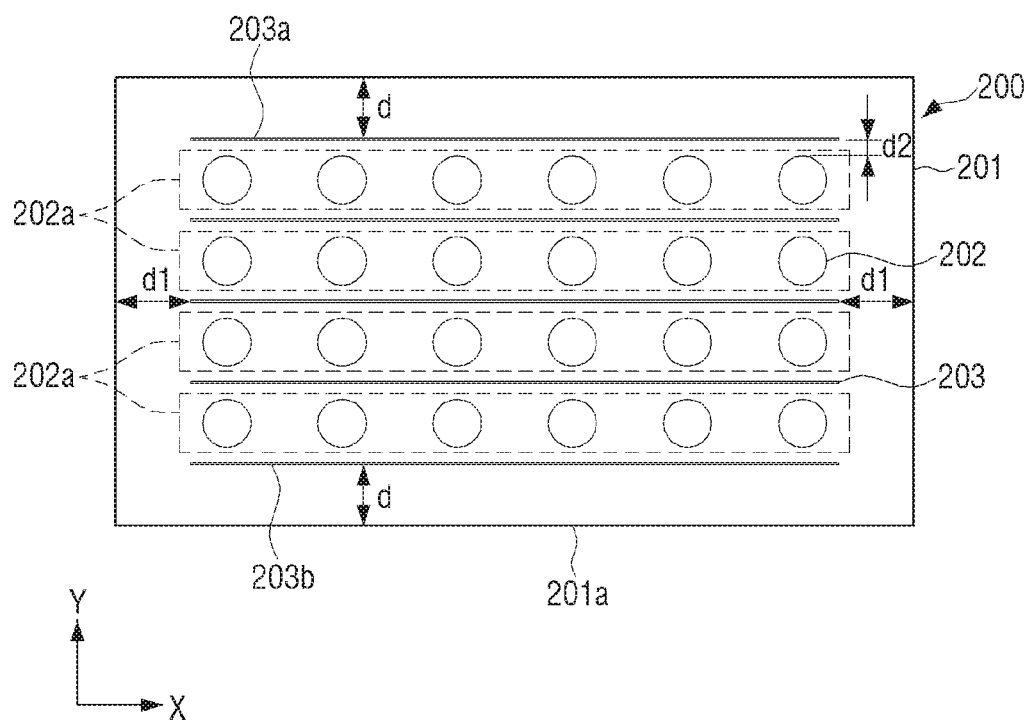
FIG. 16 is a plan view illustrating a reflective sheet for a display apparatus according to an embodiment of the disclosure used in the display apparatus of FIG. 15.

As shown in FIG. 16, the reflective sheet 200 according to an embodiment of the disclosure includes a sheet 201, a plurality of through holes 202 for exposing the plurality of light sources 53, and a beading pattern 203 for enhancing rigidity of the sheet 201. The reflective sheet 200 according to an embodiment of the disclosure including the plurality of through holes 202 and the beading pattern 203 will be described in detail below.

The bottom chassis 55 may be formed of a metal material so that heat generated from the light sources 53 or a printed circuit board may easily be radiated to the outside. The bottom chassis 55 may include a plurality of reinforcing beads to increase the rigidity of the bottom chassis 55 while reducing the thickness of the bottom chassis 55.

The optical sheet 30 is configured to improve optical characteristics of light incident on the display panel 10, and may include a high luminance prism sheet, a diffuser sheet, and the like.

Hereinafter, the reflective sheet 200 that may be used in the display apparatus 2 as illustrated in FIG. 15 will be described in detail with reference to the accompanying drawings.

Figure 17A:
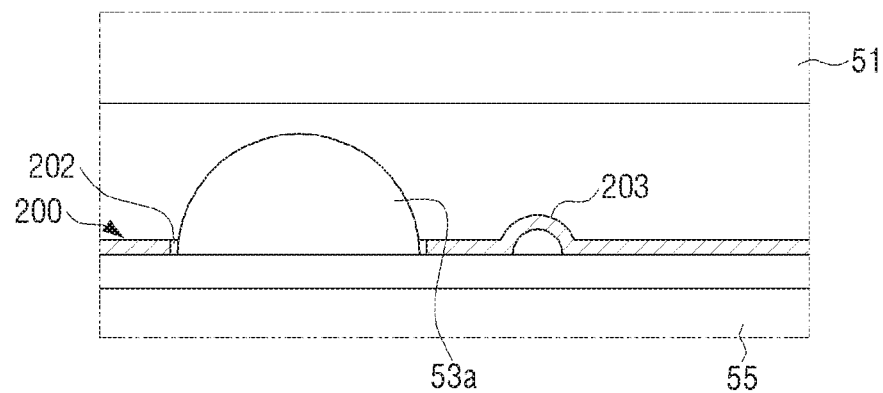
FIGS. 17A and 17B are partially enlarged cross-sectional views illustrating relationship between a reflective sheet and a light guide plate in a display apparatus according to an embodiment of the disclosure.
Figure 17B:
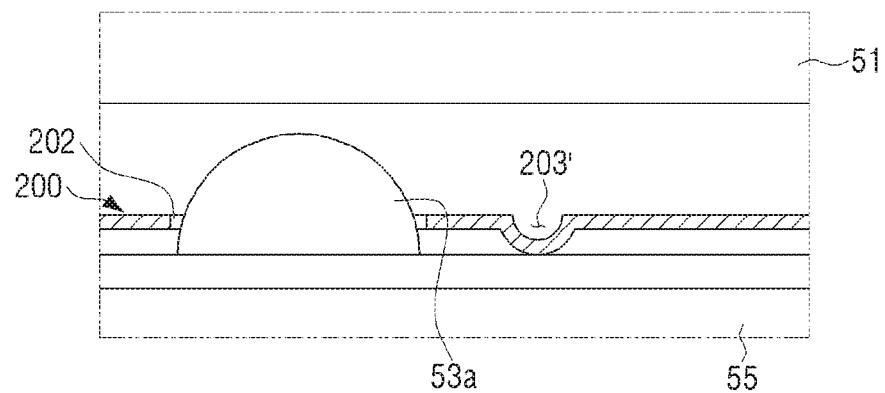

FIG. 16 is a plan view illustrating a reflective sheet for a display apparatus according to an embodiment of the disclosure used in the display apparatus of FIG. 15. FIGS. 17A and 17B are partially enlarged cross-sectional views illustrating the relationship between a reflective sheet and a light guide plate in a display apparatus according to an embodiment of the disclosure.

Referring to FIG. 16, the reflective sheet 200 according to an embodiment of the disclosure may include a sheet 201 formed to reflect light and a beading pattern 203 formed to protrude from one surface of the sheet 201.

The sheet 201 is in the form of a rectangular thin film corresponding to the shape of the light guide plate 51, and is has a white color so as to reflect light. The sheet 201 is provided with a plurality of through holes 202 so that the plurality of light sources 53 may be exposed through the through holes 202. When the light source 53 includes a light emitting diode and a lens disposed on the upper side of the light emitting diode, the through holes 202 may be formed to have a size allowing the lens to pass through.

The plurality of through holes 202 may be formed in a plurality of through hole arrays 202a. The plurality of through hole arrays 202a may be formed parallel to one edge of the sheet 201, respectively. For example, four through hole arrays 202a are illustrated in FIG. 16.

The beading pattern 203 is formed to protrude from one surface of the sheet 201 to improve the rigidity of the sheet 201.

For example, as illustrated in FIG. 17A, the beading pattern 203 may be formed to protrude in a direction in which the lens 53a of the light source 53 protrudes. In other words, the beading pattern 203 may be formed to protrude toward the light guide plate 51. Therefore, a concave groove for forming the beading pattern 203 is formed in the opposite surface of the sheet 201.

As another example, as illustrated in FIG. 17B, the beading pattern 203' may be formed as a concave groove in the direction in which the lens 53a of the light source 53 protrudes. In other words, the beading pattern 203' may be formed to be concave toward the light guide plate 51. That is, the beading pattern 203' may protrude toward the bottom chassis 55. Therefore, a protrusion protruding downward to form the beading pattern 203' is formed on the opposite surface of the sheet 201 (i.e., the surface of the sheet 201 facing the light guide plate 51).

Hereinafter, the reflective sheet 200 formed so that the beading pattern 203 protrudes toward the light guide plate 51 as illustrated in FIG. 17A will be described. However, the following description may be equally applicable to the reflective sheet 200 in which the beading pattern 203' is recessed toward the light guide plate 51 as illustrated in FIG. 17B.

The beading pattern 203 as illustrated in FIG. 16 is formed of a plurality of rectilinear beadings parallel to one edge of the sheet 201. The plurality of rectilinear beadings 203 are formed on the sheet 201 at predetermined intervals. Therefore, the plurality of rectilinear beadings 203 may be formed in parallel with the plurality of through hole arrays 202a.

The plurality of rectilinear beadings 203 may be provided parallel to the longest edge 201a of the sheet 201. At this time, each of the plurality of rectilinear beadings 203 may be formed to have a length corresponding to the length of one edge of the sheet 201. Therefore, each rectilinear beading 203 may extend in the longitudinal direction of the sheet 201 such that only one rectilinear beading 203 is formed at each position in the width direction of the sheet 201. The plurality of rectilinear beadings 203 may thus be arranged in the width direction of the sheet 201. Here, the longitudinal direction of the sheet 201 refers to a direction in which the length of the rectangular sheet 201 is long (X direction in FIG. 16), and the width direction of the sheet 201 refers to a direction in which the length of the sheet 201 is short (Y direction in FIG. 16).

Two outermost rectilinear beadings 203a and 203b among the plurality of rectilinear beadings 203 are formed to be spaced apart by a predetermined distance d from the upper edge and the lower edge of the sheet 201, respectively. At this time, the distance d between the rectilinear beading 203a and 203b and the upper edge or the lower edge of the sheet 201 may be set to be equal to or larger than a minimum distance at which the upper edge or lower edge of the sheet 201 is not deformed as the rectilinear beading 203 is formed. Also, opposite ends of each of the plurality of rectilinear beadings 203 are formed to be spaced apart by a predetermined distance d1 from opposite side edges of the sheet 201. At this time, the distance d1 between the one end of the rectilinear beadings 203 and the one side edge of the sheet 201 may be set to be not less than a minimum distance at which the side edge of the sheet 201 is not deformed as the rectilinear beading 203 is formed.

In addition, the rectilinear beadings 203 are formed to be spaced apart from the through hole arrays 202a by a predetermined distance d2. At this time, the distance d2 between the rectilinear beadings 203 and the through hole arrays 202a may be set to be equal to or larger than a minimum distance at which the through hole arrays 202a are not deformed as the rectilinear beadings 203 are formed.

Further, the plurality of rectilinear beadings forming the beading pattern 203 may have a one-to-one correspondence with the plurality of through hole arrays 202a. In detail, as illustrated in FIG. 16, one rectilinear beading 203a is formed on one side of one through hole array 202a in parallel with the through hole array 202a. At this time, in addition to the one-to-one correspondence, one more rectilinear beading 203b may be formed adjacent to the lower edge of the reflective sheet 200. When the plurality of rectilinear beadings 203 are formed in this way, there is one rectilinear beading 203 between every two adjacent through hole arrays 202a.

Figure 18:
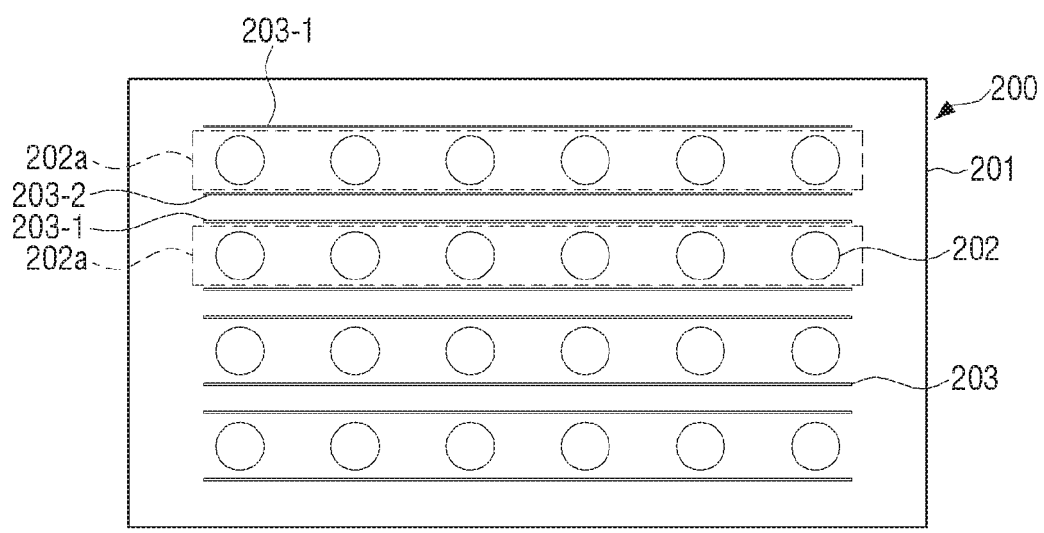
FIG. 18 is a view illustrating a reflective sheet for a display apparatus according to an embodiment of the disclosure having a plurality of rectilinear beadings as a beading pattern.

As another example, as illustrated in FIG. 18, the plurality of rectilinear beadings 203-1 and 203-2 forming the beading pattern 203 may have a two-to-one correspondence with the through hole arrays 202a. Here, FIG. 18 is a view illustrating a reflective sheet for a display apparatus according to an embodiment of the disclosure having a plurality of straight beadings as a beading pattern.

In detail, as illustrated in FIG. 18, for each through hole array 202a, two rectilinear beadings 203-1 and 203-2 are formed on the upper and lower sides of the through hole array 202a in parallel with the through hole array 202a. In other words, two rectilinear beadings 203-1 and 203-2 are disposed on the upper and lower sides, respectively, of each single through hole array 202a. Therefore, there are two rectilinear beadings 203 corresponding to each of the plurality of through hole arrays 202a and the two rectilinear beadings 203 are disposed at the upper and lower sides of the through hole array 202a in parallel with each other. When the plurality of rectilinear beadings 203 are formed in this manner, there are two rectilinear beadings 203-1 and 203-2 between every two adjacent through hole arrays 202a as shown in FIG. 18.

The cross-section of each of the plurality of rectilinear beadings 203 may be formed to be the same or similar to the cross-section of each of the plurality of rectilinear beadings 103 according to the above-described embodiment.

Figure 19:
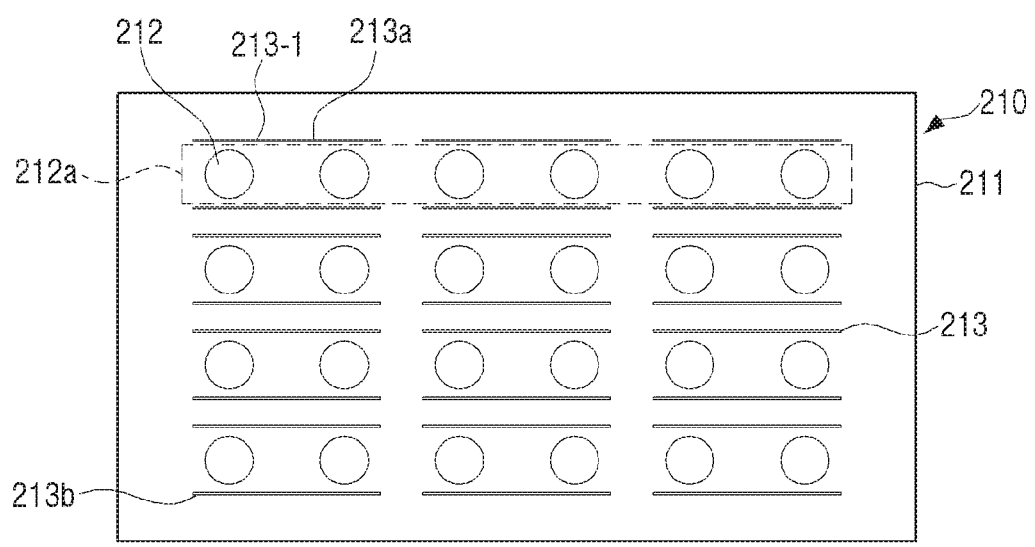
FIG. 19 is a view illustrating a reflective sheet for a display apparatus according to an embodiment of the disclosure having a plurality of dotted beadings as a beading pattern.

FIG. 19 is a view illustrating a reflective sheet for a display apparatus according to an embodiment of the disclosure having a plurality of dotted beadings (i.e., dashed beadings) as a beading pattern.

Referring to FIG. 19, a beading pattern 213 of a reflective sheet 210 is formed by a plurality of dotted beadings. Here, the dotted beading 213 refers to a plurality of rectilinear beads 213-1 having a short length that are formed at predetermined intervals along the through hole arrays 212a in the sheet 211. At this time, short rectilinear beadings 213-1 constituting each of the plurality of dotted beadings 213 may be formed to have a length corresponding to at least two through holes 212. In FIG. 19, for example, the short rectilinear beading 213-1 is formed to have a length substantially similar to the distance between external edges of two adjacent through holes 212. In addition, the plurality of dotted beadings 213 may have a two-to-one correspondence with the plurality of through hole arrays 212a, respectively. In other words, for each through hole array 212a, two lines of rectilinear beadings 213 are formed on the upper and lower sides, respectively, of the through hole array 212a. However, as another example, although not illustrated, the plurality of dotted beadings 213 may be formed to correspond one-to-one with the plurality of through hole arrays 212a.

At this time, the outermost two dotted beadings 213a and 213b of the plurality of dotted beadings 213 are formed to be spaced apart from the upper edge and lower edge of the sheet 211 by a predetermined distance, respectively. Also, opposite ends of each of the plurality of dotted beadings 213 are formed to be spaced apart from opposite side edges of the sheet 211 by a predetermined distance.

In addition, the dotted beading 213 is formed to be spaced apart from the through hole arrays 212a by a predetermined distance. At this time, the distance between the dotted beadings 213 and the through hole arrays 212a may be set to be equal to or larger than a minimum distance at which the through hole array 212a is not deformed as the dotted beadings 213 are formed.

The cross-section of each of the dotted beadings 213 may be formed to be the same as or similar to the cross-section of each of the plurality of rectilinear beadings 103 as described above.

In FIG. 19, the plurality of dotted beadings forming the beading pattern 213 are formed on the outside of the through hole array 202a. However, the dotted beading may be formed to extend between two adjacent through holes 212.

Figure 20:
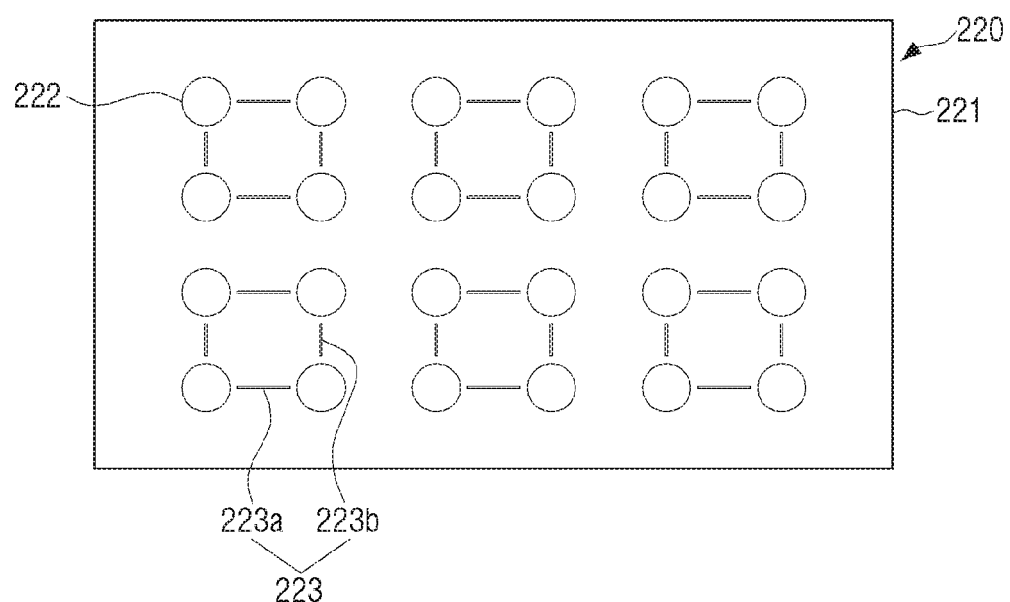
FIG. 20 is a view illustrating a reflective sheet for a display apparatus according to an embodiment of the disclosure having a plurality of dotted beadings as a beading pattern.

FIG. 20 is a view illustrating a reflective sheet for a display apparatus provided with a beading pattern formed of dotted beadings that each extend between two adjacent through holes.

Referring to FIG. 20, dotted beadings forming the beading pattern 223 of the reflective sheet 220 are formed between the two adjacent through holes 222 on the sheet 221. The plurality of dotted beadings 223 may include horizontal dotted beadings 223a extending between two horizontally adjacent through holes 222 and vertical dotted beadings 223b extending between two vertically adjacent through holes 222. Accordingly, the plurality of dotted beadings 223 extending between the plurality of through holes 222 are arranged in a substantially square shape as shown in FIG. 20.

Figure 21:
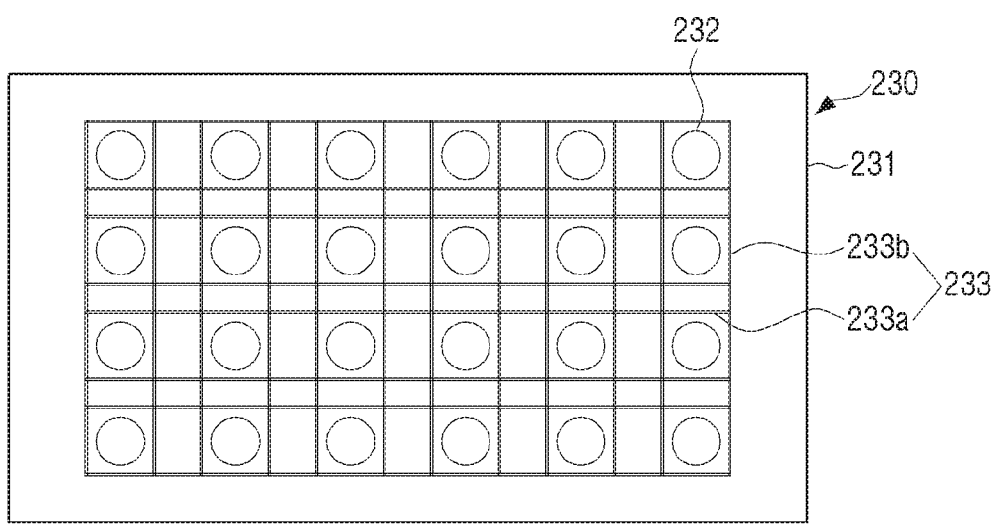
FIG. 21 is a view illustrating a reflective sheet for a display apparatus according to an embodiment of the disclosure having a grid pattern beading as a beading pattern.

FIG. 21 is a view illustrating a reflective sheet for a display apparatus according to an embodiment of the disclosure having a grid pattern beading as a beading pattern.

Referring to FIG. 21, a beading pattern 233 of a reflective sheet 230 is formed of a grid pattern beading. In other words, the grid pattern beading 233 is formed such that a plurality of horizontal rectilinear beadings 233a and a plurality of vertical rectilinear beadings 233b cross each other at right angles. At this time, the grid pattern beading 233 may be formed so that each of the plurality of through holes 232 is located within one grid (i.e., a unit square).

The four rectilinear beadings forming the edges of the grid pattern beading 233 are formed to be spaced apart from the upper edge, the lower edge, and both side edges of the sheet 231 by a predetermined distance. At this time, the predetermined distance may be set to be equal to or larger than a minimum distance at which the edges of the sheet 231 are not deformed as the grid pattern beading 233 is formed.

In addition, the horizontal rectilinear beadings 233a and the vertical rectilinear beadings 233b forming the grid pattern beading 233 are spaced apart from the through holes 232 by a predetermined distance. At this time, the distances between the horizontal rectilinear beadings 233a and the through holes 232 and between the vertical rectangular beadings 233b and the through holes 232 may be set to be equal to or larger than a minimum distance at which the through holes 232 are not deformed as the grid pattern beading 233 is formed.

The grid pattern beading 233 as illustrated in FIG. 21 has a structure in which opposite ends of the plurality of vertical rectilinear beadings 233b do not extend beyond the top and bottom horizontal rectilinear beadings 233a and opposite ends of the plurality of horizontal rectilinear beadings 233a do not extend beyond the leftmost and rightmost vertical rectilinear beadings 233b. However, as another example, although not illustrated, the opposite ends of the plurality of vertical rectilinear beadings 233b may be formed to extend beyond the top and bottom horizontal rectilinear beadings 233a. The opposite ends of the plurality of horizontal rectilinear beadings 233a may be formed to extend beyond the leftmost and rightmost vertical rectilinear beadings 233b.

The cross-section of each of the plurality of rectilinear beadings 233a and 233b forming the grid pattern beading 233 may be the same or similar to the cross-section of each of the plurality of rectilinear beadings 103 as described above.

Figure 22:
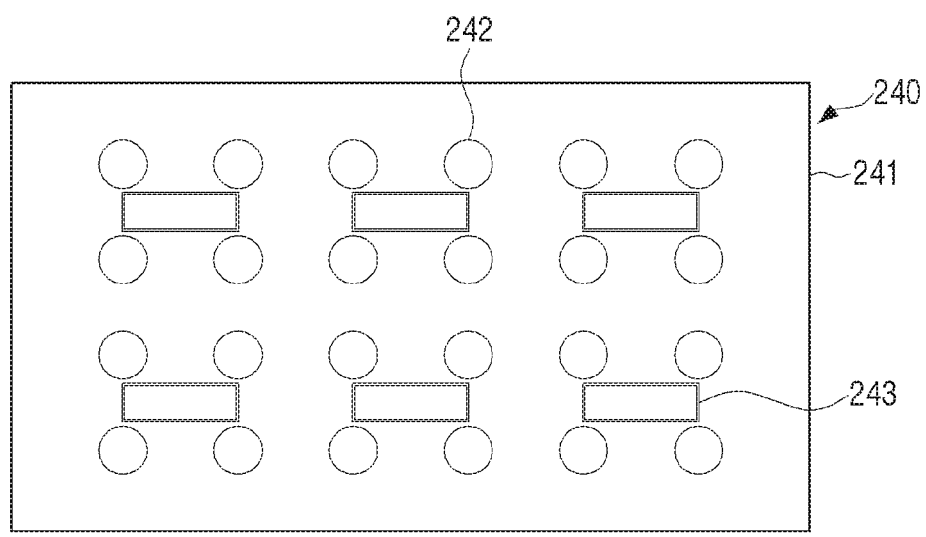
FIG. 22 is a view illustrating a reflective sheet for a display apparatus according to an embodiment of the disclosure having a plurality of rectangular beadings as a beading pattern.

FIG. 22 is a view illustrating a reflective sheet for a display apparatus according to an embodiment of the disclosure having a plurality of rectangular beadings as a beading pattern.

Referring to FIG. 22, a beading pattern 243 of a reflective sheet 240 is formed of a plurality of rectangular beadings. Each of the plurality of rectangular beadings 243 may be formed to be surrounded by four adjacent through holes 242 forming a rectangle among a plurality of through holes 242. In other words, first, second, third, and fourth through holes 242 are formed at respective corners of each rectangular beading. At this time, the through hole 242 is not formed in the inside of the rectangular beading 243. Accordingly, the plurality of rectangular beadings 243 are formed to have the substantially same size, and may be arranged in both the longitudinal direction and the width direction of the sheet 241.

In FIG. 22, one rectangular beading 243 is surrounded by four adjacent through holes 242 forming a rectangle, but the rectangular beading 243 is not limited thereto. As another example, although not illustrated, one rectangular beading may be surrounded by six or more adjacent through holes 242 which are arranged in two lines and form a rectangle.

The rectangular beadings 243 are formed to be spaced apart from the through holes 242 by a predetermined distance. At this time, the distance between the rectangular beadings 243 and the through holes 242 may be set to be equal to or larger than a minimum distance at which the through holes 242 are not deformed as the plurality of rectangular beadings 243 are formed.

The cross-section of the rectilinear beading forming each side of the rectangular beading 243 may be formed to be the same or similar to the cross-section of each of the plurality of rectilinear beadings 103 as described above.

Figure 23:
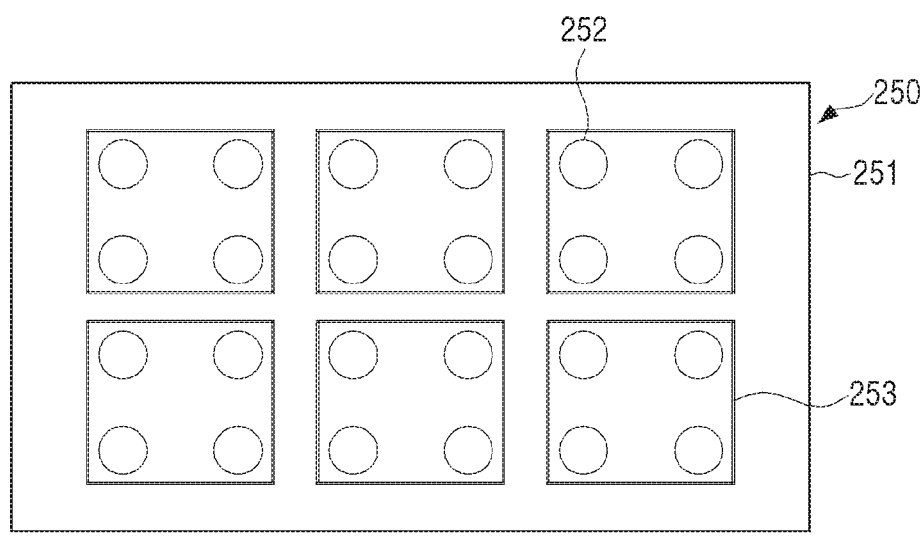
FIG. 23 is a view illustrating a reflective sheet for a display apparatus according to an embodiment of the disclosure having a plurality of rectangular beadings as a beading pattern.

FIG. 23 is a view illustrating a reflective sheet for a display apparatus according to an embodiment of the disclosure having a plurality of rectangular beadings as a beading pattern.

Referring to FIG. 23, a beading pattern 253 of a reflective sheet 250 is formed of a plurality of rectangular beadings. Each of the plurality of rectangular beadings 253 may be formed to surround four adjacent through holes 252 forming a rectangle among a plurality of through holes 252. In other words, each rectangular beading surround a respective group of four adjacent through holes to form a rectangle around the respective group of through holes. At this time, the four through holes 252 are present in the inside of the rectangular beading 253. Accordingly, the plurality of rectangular beadings 253 may be formed to have substantially the same size, and may be arranged in both the longitudinal direction and the width direction of the sheet 251.

In FIG. 23, one rectangular beading 253 is formed to surround four adjacent through holes 252 forming a rectangle, but the rectangular beading is not limited thereto. As another example, although not illustrated, one rectangular beading may be formed to surround six or more adjacent through holes 252 forming a rectangle.

The rectangular beadings 253 are formed to be spaced apart from the through holes 252 by a predetermined distance. At this time, the distance between the rectangular beadings 253 and the through holes 252 may be set to be equal to or larger than a minimum distance at which the through holes 252 are not deformed as the plurality of rectangular beadings 253 are formed.

The outermost rectangular beadings 253 among the plurality of rectangular beadings 253 are spaced apart from the edges of the sheet 251 by a predetermined distance. At this time, the predetermined distance may be set to be equal to or larger than a minimum distance at which the edges of the sheet 251 are not deformed as the plurality of rectangular beadings 253 are formed.

The cross-section of the rectilinear beading forming each side of the rectangular beading 253 may be formed to be the same or similar to the cross-section of each of the plurality of rectilinear beadings 103 as described above.

Figure 24:
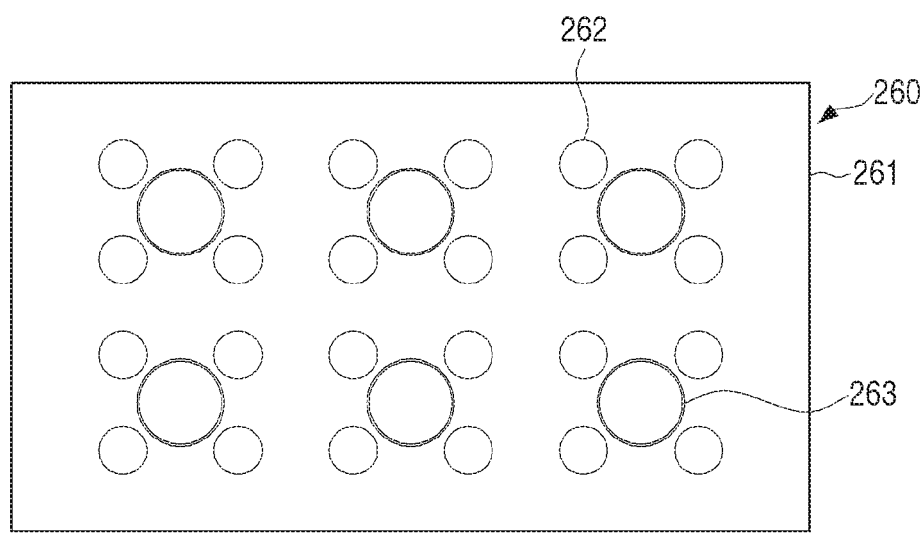
FIG. 24 is a view illustrating a reflective sheet for a display apparatus according to an embodiment of the disclosure having a plurality of circular beadings as a beading pattern.

FIG. 24 is a view illustrating a reflective sheet for a display apparatus according to an embodiment of the disclosure having a plurality of circular beadings as a beading pattern.

Referring to FIG. 24, a beading pattern 263 of a reflective sheet 260 is formed of a plurality of circular beadings. Each of the plurality of circular beadings 263 may be formed to be surrounded by four adjacent through holes 262 forming a rectangle among a plurality of through holes 262. In other words, first, second, third, and fourth through holes 262 form a rectangle around each circular beading. At this time, the through hole 262 is not formed in the inside of the circular beadings 263. Accordingly, the plurality of circular beadings 263 may be formed to have the substantially same size, and may be arranged in both the longitudinal direction and the width direction of the sheet 261.

The circular beadings 263 are formed to be spaced apart from the through holes 262 by a predetermined distance. At this time, the distance between the circular beadings 263 and the through holes 262 may be set to be equal to or larger than a minimum distance at which the through holes 262 are not deformed as the plurality of circular beadings 263 are formed.

The cross-section of the circular beading 263 may be formed to be the same or similar to the cross-section of each of the plurality of rectilinear beadings 103 as described above.

Figure 25:
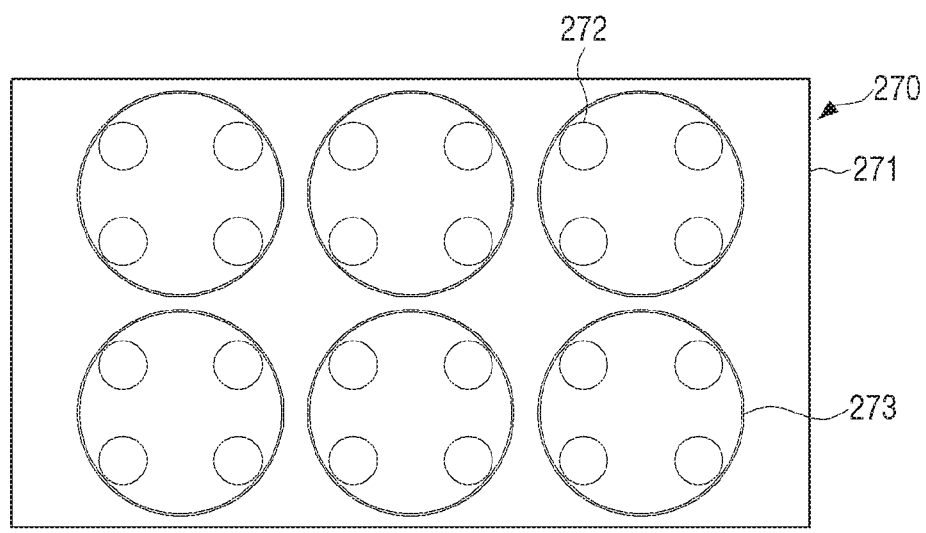
FIG. 25 is a view illustrating a reflective sheet for a display apparatus according to an embodiment of the disclosure having a plurality of circular beadings as a beading pattern.

FIG. 25 is a view illustrating a reflective sheet for a display apparatus according to an embodiment of the disclosure having a plurality of circular beadings as a beading pattern.

Referring to FIG. 25, a beading pattern 273 of a reflective sheet 270 is formed of a plurality of circular beadings. Each of the plurality of circular beadings 273 may be formed to surround four adjacent through holes 272 forming a rectangle among a plurality of through holes 272. In other words, each circular beading surrounds a respective group of four adjacent through holes 272 to form a circle around the respective group of four adjacent through holes 272. At this time, the four through holes 272 are present in the inside of the circular beading 273. Accordingly, the plurality of circular beadings 273 may be formed to have the substantially same size, and may be arranged in both the longitudinal direction and the width direction of the sheet 271.

In FIG. 25, one circular beading 273 is formed to surround four adjacent through holes 252 forming a rectangle, but the circular beading is not limited thereto. As another example, although not illustrated, one circular beading may be formed to surround six or more adjacent through holes forming a rectangle.

The circular beadings 273 are formed to be spaced apart from the through holes 272 by a predetermined distance. At this time, the distance between the circular beadings 273 and the through holes 272 may be set to be equal to or larger than a minimum distance at which the through holes 272 are not deformed as the plurality of circular beadings 273 are formed.

The cross-section of the circular beading 273 may be formed to be the same or similar to the cross-section of each of the plurality of rectilinear beadings 103 as described above.

Figure 26:
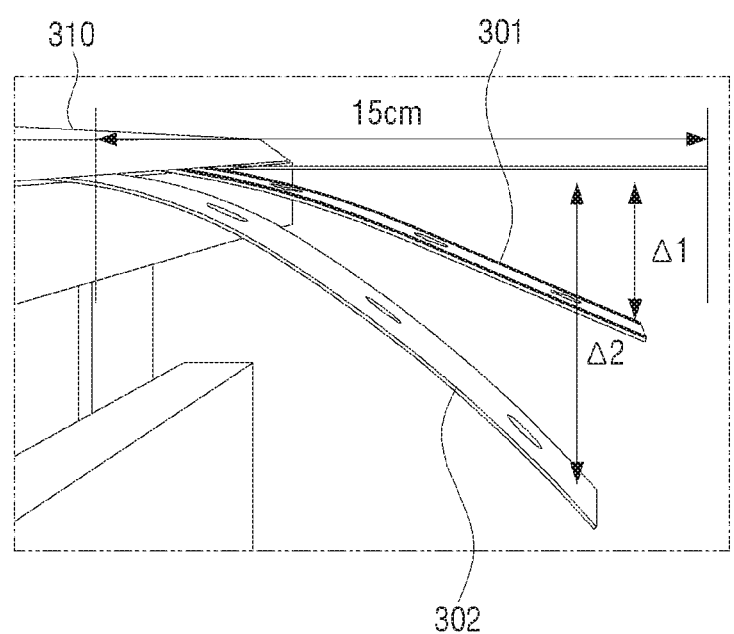
FIG. 26 is a view showing a result of an experiment comparing the rigidity of a reflective sheet for a display apparatus according to an embodiment of the disclosure with that of a conventional reflective sheet.

FIG. 26 shows a result of an experiment comparing the rigidity of a reflective sheet for a display apparatus according to an embodiment of the disclosure with that of a conventional reflective sheet.

FIG. 26 shows a state in which the deflection of a test piece 301 of the reflective sheet according to an embodiment of the disclosure is compared with deflection of a conventional test piece 302 of the reflective sheet according to related art.

The test piece 301 of the reflective sheet according to an embodiment of the disclosure is formed having a narrow width and a long length and includes a through hole array having a plurality of through holes and two rectilinear beadings formed on respective sides of the through hole arrays as the beading pattern. The conventional test piece 302 of the reflective sheet according to related art is formed having a narrow width and a long length like the test piece 301 of the reflective sheet according to the disclosure and includes only one through hole array without including a beading pattern.

The test piece 301 of the reflective sheet according to an embodiment of the disclosure and the conventional test piece 302 of the reflective sheet according to related art are protruded by about 15 cm from one end of a support table 310 as illustrated in FIG. 26, and then the deflection amounts 41 and 42 of the test pieces 301 and 302 are checked.

As can be seen from FIG. 26, the deflection amount 41 of the test piece 301 of the reflective sheet according to an embodiment of the disclosure is approximately ½ of the deflection amount 42 of the conventional test piece 302 of the reflective sheet according to related art. From this result, it can be seen that the rigidity of the reflective sheet according to an embodiment of the disclosure is greater than the rigidity of the reflective sheet according to related art.

Therefore, when the beading pattern is formed on the reflective sheet as in the disclosure, the rigidity of the reflective sheet may be increased. By improving the rigidity of the reflective sheet in this way, the sagging or lifting of the reflective sheet may be prevented or reduced. Therefore, the image stain phenomenon of the display apparatus caused by the sagging and lifting of the reflective sheet may be prevented and image quality may be improved.

While embodiments of the present disclosure have been described, additional variations and modifications of the described embodiments may occur to those skilled in the art. Therefore, it is intended that the appended claims shall be construed to include both the above embodiments and all such variations and modifications that fall within the spirit and scope of the disclosure.

What is claimed is:

1. A reflective sheet for a display apparatus, the reflective sheet comprising:
   a sheet configured to reflect light; and
   a plurality of beading patterns protruding from a surface of the sheet,
   wherein each of the plurality of beading patterns protrudes toward and contacts a surface facing the reflective sheet,
   wherein a shape of a contact portion of the plurality of beading patterns that contacts the surface facing the reflective sheet comprises one from among a hollow polygonal shape, a hollow circular shape, and a hollow elliptic shape, and
   wherein the contact portion of the plurality of beading patterns surrounds an exposed portion of the sheet that is exposed to the surface facing the reflective sheet.

2. The reflective sheet of claim 1, wherein the plurality of beading patterns comprises a plurality of rectilinear beadings parallel to an edge of the sheet.

3. The reflective sheet of claim 2, wherein each rectilinear beading from among the plurality of rectilinear beadings has a length corresponding to a length of the edge of the sheet.

4. The reflective sheet for a display apparatus of claim 1, wherein the plurality of beading patterns comprises a plurality of dashed beadings parallel to an edge of the sheet.

5. The reflective sheet for a display apparatus of claim 1, wherein the plurality of beading patterns comprises a grid pattern beading.

6. The reflective sheet for a display apparatus of claim 1, wherein the plurality of beading patterns comprises one from among a plurality of polygonal beadings, a plurality of circular beadings, and a plurality of elliptic beadings.

7. The reflective sheet for a display apparatus of claim 1, wherein the plurality of beading patterns comprises a beading, and
wherein a cross-section of the beading is one from among a triangle, a quadrangle, a semicircle, and a semi-ellipse.

8. The reflective sheet for a display apparatus of claim 1 further comprising:
a plurality of through holes formed at predetermined intervals on the sheet.

9. The reflective sheet for a display apparatus of claim 8, wherein the plurality of through holes comprises a plurality of through hole arrays parallel to an edge of the sheet,
wherein the plurality of beading patterns comprises a plurality of rectilinear beadings, and
wherein each rectilinear beading from among the plurality of rectilinear beadings extends adjacent to a through hole array from among the plurality of through hole arrays such that there is a one-to-one correspondence between the plurality of rectilinear beadings and the plurality of through hole arrays.

10. The reflective sheet for a display apparatus of claim 8, wherein the plurality of through holes comprises a plurality of through hole arrays parallel to an edge of the sheet,
wherein the plurality of beading patterns comprises a plurality of rectilinear beadings, and
wherein, for each through hole array from among the plurality of through hole arrays, a first rectilinear beading from among the plurality of rectilinear beadings extends adjacent to and on a first side of the through hole array and a second rectilinear beading from among the plurality of rectilinear beadings extends adjacent to and on a second side of the through hole array such that there is a two-to-one correspondence between the plurality of rectilinear beadings and the plurality of through hole arrays.

11. The reflective sheet for a display apparatus of claim 8, wherein the plurality of beading patterns comprises a grid pattern beading, and
wherein each through hole from among the plurality of through holes is positioned within a respective unit square of the grid pattern beading.

12. The reflective sheet for a display apparatus of claim 8, wherein the plurality of beading patterns comprises a plurality of rectangular beadings, and
wherein first, second, third, and fourth through holes from among the plurality of through holes are positioned at respective corners of each rectangular beading from among the plurality of rectangular beadings.

13. The reflective sheet for a display apparatus of claim 8, wherein the plurality of beading patterns comprises a plurality of rectangular beadings, and
wherein each rectangular beading from among the plurality of rectangular beadings surrounds a respective group of four adjacent through holes to form a rectangle around the respective group of four adjacent through holes.

14. The reflective sheet for a display apparatus of claim 8, wherein
the plurality of beading patterns comprises a plurality of circular beadings, and
wherein respective first, second, third, and fourth through holes from among the plurality of through holes form a rectangle around each circular beading from among the plurality of circular beadings.

15. The reflective sheet for a display apparatus of claim 8, wherein
the plurality of beading patterns comprises a plurality of circular beadings, and
wherein each circular beading from among the plurality of circular beadings surrounds a respective group of four adjacent through holes to form a circle around the respective group of four adjacent through holes.

16. The reflective sheet of claim 7, wherein the cross-section of the beading is one from among the semicircle and the semi-ellipse.

17. The reflective sheet of claim 1, wherein the plurality of beading patterns comprises a beading having a rectangular cross-section.

18. A display apparatus comprising:
a light guide plate;
a bottom chassis disposed below the light guide plate; and
a reflective sheet disposed on a top surface of the bottom chassis,
wherein the reflective sheet comprises:
a sheet configured to reflect light; and
a plurality of beading patterns protruding from a surface of the sheet, and
wherein each of the plurality of beading patterns protrudes toward and contacts one of the light guide plate and the bottom chassis,
wherein a shape of a contact portion of the plurality of beading patterns that contacts the one of the light guide plate and the bottom chassis comprises one from among a hollow polygonal shape, a hollow circular shape, and a hollow elliptic shape, and
wherein the contact portion of the plurality of beading patterns surrounds an exposed portion of the sheet that is exposed to the one of the light guide plate and the bottom chassis.

19. The display apparatus of claim 18, wherein the plurality of beading patterns of the reflective sheet protrudes toward the light guide plate.

20. The display apparatus of claim 18, wherein the plurality of beading patterns of the reflective sheet protrudes toward the bottom chassis.

21. The display apparatus of claim 18, wherein the bottom chassis comprises a plurality of reinforcing beads, and
wherein the plurality of beading patterns of the reflective sheet is disposed at a position on the reflective sheet that overlaps the plurality of reinforcing beads of the bottom chassis in a top-bottom direction of the display apparatus.

22. The display apparatus of claim 21, wherein for each reinforcing bead from among the plurality of reinforcing beads, the plurality of beading patterns comprises at least one respective rectilinear beading that extends across the reinforcing bead.

* * * * *